United States Patent
Park et al.

(10) Patent No.: US 11,736,162 B2
(45) Date of Patent: *Aug. 22, 2023

(54) METHOD FOR TRANSMITTING AND RECEIVING CHANNEL STATE INFORMATION IN WIRELESS COMMUNICATION SYSTEM AND APPARATUS THEREFOR

(71) Applicant: LG ELECTRONICS INC., Seoul (KR)

(72) Inventors: Haewook Park, Seoul (KR); Kijun Kim, Seoul (KR); Sangrim Lee, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/470,567

(22) Filed: Sep. 9, 2021

(65) Prior Publication Data

US 2022/0006497 A1 Jan. 6, 2022

Related U.S. Application Data

(63) Continuation of application No. 16/496,839, filed as application No. PCT/KR2018/003438 on Mar. 23, 2018, now Pat. No. 11,271,625.
(Continued)

(51) Int. Cl.
*H04B 7/06* (2006.01)
*H04B 7/0456* (2017.01)
(Continued)

(52) U.S. Cl.
CPC ......... *H04B 7/0486* (2013.01); *H04B 7/0617* (2013.01); *H04B 7/0626* (2013.01);
(Continued)

(58) Field of Classification Search
CPC .. H04B 7/0456; H04B 7/0452; H04B 7/0417; H04B 7/0486; H04B 7/0626;
(Continued)

(56) References Cited

U.S. PATENT DOCUMENTS

2013/0267240 A1  10/2013  Fu
2014/0177745 A1  6/2014  Krishnamurthy et al.
(Continued)

FOREIGN PATENT DOCUMENTS

AU    2015234324    10/2015
JP    2009-538556   11/2009
(Continued)

OTHER PUBLICATIONS

EP extended European search report, in European Appln. No. 18772024.8, dated Nov. 17, 2020, 9 pages.
(Continued)

*Primary Examiner* — Jung Liu
(74) *Attorney, Agent, or Firm* — Fish & Richardson P.C.

(57) ABSTRACT

Disclosed are a method for transmitting and receiving channel state information in wireless communication system and an apparatus therefor. Specifically, a method for transmitting, by a user equipment (UE), Channel State Information (CSI) in a wireless communication system may include: receiving, from a base station, a channel state information reference signal (CSI-RS) through multiple antenna ports; and reporting, to the base station, CSI, in which the CSI may include selection information indicating a plurality of codewords used for generating a precoding matrix in a codebook for reporting the CSI, and a power coefficient, a phase offset, and a phase shift value applied to each of the plurality of codewords in terms of a configured bandwidth, and the precoding matrix may be generated in units of subbands within the configured bandwidth based on a linear combi-
(Continued)

nation of the power coefficient, the phase offset, and the phase change value.

8 Claims, 24 Drawing Sheets

Related U.S. Application Data

(60) Provisional application No. 62/505,100, filed on May 11, 2017, provisional application No. 62/501,825, filed on May 5, 2017, provisional application No. 62/475,833, filed on Mar. 23, 2017.

(51) Int. Cl.
  *H04L 5/00* (2006.01)
  *H04L 27/26* (2006.01)
(52) U.S. Cl.
  CPC ......... *H04B 7/0632* (2013.01); *H04B 7/0639* (2013.01); *H04B 7/0658* (2013.01); *H04L 5/0051* (2013.01); *H04L 27/2636* (2013.01)
(58) Field of Classification Search
  CPC .. H04B 7/0639; H04B 7/0658; H04B 7/0421; H04B 7/065; H04L 1/0023; H04L 1/003; H04L 1/0029; H04L 5/0023; H04L 5/0057; H04L 5/0048; G06F 17/16
  See application file for complete search history.

(56) References Cited

U.S. PATENT DOCUMENTS

| | | | |
|---|---|---|---|
| 2015/0036610 A1 | 2/2015 | Kim et al. | |
| 2016/0142117 A1* | 5/2016 | Rahman | H04B 7/0486 375/267 |
| 2016/0373178 A1 | 12/2016 | Nam et al. | |
| 2018/0034519 A1* | 2/2018 | Rahman | H04B 7/0452 |
| 2020/0136682 A1* | 4/2020 | Faxér | H04B 7/0639 |
| 2020/0358483 A1* | 11/2020 | Faxér | H04B 7/0626 |

FOREIGN PATENT DOCUMENTS

| | | |
|---|---|---|
| JP | 2010516080 | 5/2010 |
| JP | 2011-529660 | 12/2011 |
| JP | 2017050758 | 3/2017 |
| KR | 1020140121830 | 10/2014 |
| WO | WO2017006873 | 1/2017 |
| WO | WO2017014609 | 1/2017 |

OTHER PUBLICATIONS

Intel Corporation, "On NR Type II category 2 codebook," R1-1702206, 3GPP TSG RAN WG1 #88, Athens, Greece, dated Feb. 13-17, 2017, 5 pages.
JP Office Action in Japanese Appln. No. 2019-552525, dated Dec. 15, 2020, 8 pages (with English translation).
KR Office Action in Korean Appln. No. 10/2019/7029169, dated Jun. 5, 2020, 15 pages (with English translation).
LG Electronics, "Discussion on CSI feedback Type II," R1-1702457, 3GPP TSG RAN WG1 Meeting#88, Athens, Greece, dated Feb. 13-17, 2017, 6 pages.
LG Electronics, "Discussion on CSI feedback Type II," R1-1704884, 3GPP TSG RAN WG1 Meeting#88bis, Spokane, USA, dated Apr. 3-7, 2017, 4 pages.
NTT DOCOMO, "CSI Feedback Type II for NR MIMO," R1-1702843, 3GPP TSG RAN WG1 Meeting #88, Athens, Greece, dated Feb. 13-17, 2017, 7 pages.
PCT International Search Report in International Appln. No. PCT/KR2018/003438, dated Aug. 23, 2018, 9 pages (with English translation).
Samsung, "Linear combination codebook design framework," R1-1612415, 3GPP TSG RAN WG1 Meeting #87, Reno, USA, dated Nov. 14-18, 2016, 6 pages.
Samsung, "Rank 2 linear combination codebook and simulation results," R1-1612417, 3GPP TSG RAN WG1 Meeting #87, Reno, USA, Nov. 14-18, 2016, 7 pages.
ZTE, ZTE Microelectronics, "Linear combination based CSI feedback design for NR MIMO," R1-1701809, 3GPP TSG RAN WG1 Meeting #88, Athens, Greece, dated Feb. 13-17, 2017, 9 pages.
Office Action in Chinese Appln. No. 201880026615.8, dated Nov. 2, 2022, 14 pages (with English translation).
Office Action in Japanese Appln. No. 2021-146244, dated Sep. 27, 2022, 7 pages (with English translation).

* cited by examiner

METHOD FOR TRANSMITTING AND RECEIVING CHANNEL STATE INFORMATION IN WIRELESS COMMUNICATION SYSTEM AND APPARATUS THEREFOR

CROSS-REFERENCE TO RELATED APPLICATIONS

This application is a continuation of U.S. application Ser. No. 16/496,839, filed on Sep. 23, 2019, which is a National Phase Application under 35 U.S.C. § 371 of International Application No. PCT/KR2018/003438, filed on Mar. 23, 2018, which claims the benefit of U.S. Application Ser. No. 62/505,100, filed on May 11, 2017, U.S. Application Ser. No. 62/501,825, filed May 5, 2017, and U.S. Application Ser. No. 62/475,833, filed on May 23, 2017. The disclosures of the prior applications are incorporated by reference in their entirety.

TECHNICAL FIELD

The present disclosure relates to a wireless communication system, and more particularly, to a method and an apparatus for transmitting and receiving channel state information in a wireless communication system supporting a multi-antenna system (in particular, 2 dimensional active antenna system (2D AAS)).

BACKGROUND

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

SUMMARY

An object of the present disclosure is to propose a method for transmitting and receiving channel state information in a wireless communication system supporting a multi-antenna system (e.g., a 2D AAS system or a 3 dimensional multi-input multi-output (3D-MIMO) system with a massive antenna port).

An object of the present disclosure is to propose a method for transmitting and receiving channel state information and a codebook designing method in a wireless communication system supporting a linear combining codebook for combining beams in units of subbands.

The technical objects of the present disclosure are not limited to the aforementioned technical objects, and other technical objects, which are not mentioned above, will be apparently appreciated by a person having ordinary skill in the art from the following description.

According to an aspect of the present disclosure, a method for transmitting, by a user equipment (UE), Channel State Information (CSI) in a wireless communication system may include: receiving, from a base station, a channel state information reference signal (CSI-RS) through multiple antenna ports; and reporting, to the base station, CSI, in which the CSI may include selection information indicating a plurality of codewords used for generating a precoding matrix in a codebook for reporting the CSI, and a power coefficient, a phase offset, and a phase shift value applied to each of the plurality of codewords in terms of a configured bandwidth, and the precoding matrix may be generated in units of subbands within the configured bandwidth based on a linear combination of the power coefficient, the phase offset, and the phase change value.

According to another aspect of the present disclosure, a user equipment (UE) for transmitting V (CSI) in a wireless communication system may include: a radio frequency (RF) unit transmitting and receiving a radio signal; and a processor controlling the RF unit, in which the processor may be configured to receive, from a base station, a Channel State Information Reference Signal (CSI-RS) through multiple antenna ports, and report, to the base station, CSI, the CSI may include selection information indicating a plurality of codewords used for generating a precoding matrix in a codebook for reporting the CSI, and a power coefficient, a phase offset, and a phase shift value applied to each of the plurality of codewords in terms of a configured bandwidth, and the precoding matrix may be generated in units of subbands within the configured bandwidth based on a linear combination of the power coefficient, the phase offset, and the phase change value.

Preferably, the phase change value may be derived from a Fast Fourier Transform (FFT) size in the configured band, an oversampling value, a speed at which a phase of a beam formed by each of the plurality of codewords is changed.

Preferably, the power coefficient, the phase offset, and the phase change value may be derived in units of the subbands with respect to each of the plurality of codewords by projecting the plurality of codewords to a channel matrix in units of the subbands.

Preferably, a frequency domain sample for each of the plurality of codewords may be calculated by projecting the plurality of codewords to the channel matrix in units of the subbands, and the phase change value may be derived from one or more time domain samples for each of the plurality of codewords acquired by applying Inverse Fast Fourier Transform (IFFT) to the frequency domain sample and the Fast Fourier Transform (FFT) size in the configured band.

Preferably, as the one or more time domain samples, a time domain sample having a strongest value or a maximum delay value may be used.

Preferably, as the one or more time domain samples, one or more consecutive time domain samples having the time domain sample having the strongest value or the maximum delay value may be used.

Preferably, the number of time domain samples used for deriving the phase change value may be determined based on a delay spread of a channel.

Preferably, as the one or more time domain samples, K time domain samples having a strong power value and a time domain sample having the strongest value or the maximum delay value among the remaining time domain samples except for the K time domain samples are used.

Preferably, in the case of rank 2, the linear combination may be independently applied for each precoding matrix for each layer.

Preferably, after the precoding matrix is generated, an orthogonal process may be applied to the precoding matrix for each layer in order to maintain orthogonality for each layer.

Preferably, Channel Quality Information (CQI) may be calculated based on the precoding matrix to which the orthogonal process is applied.

Preferably, in the case of rank 2, a first precoding matrix for any one layer may be generated by using the linear combination and a second precoding matrix for the remaining layer is generated by applying an orthogonal code to the first precoding matrix.

Preferably, quantization may be performed or higher granularity quantization is performed for reporting the power coefficient, the phase offset, and/or the phase change value only for a beam which exceeds a specific power threshold among the beams formed by the plurality of codewords.

Preferably, when the configured bandwidth is divided into a plurality of subband groups, the precoding matrix is independently generated by using the plurality of codewords for each subband group.

Preferably, the plurality of codewords may include a first codeword forming a leading beam and one or more second codewords forming a combining beam, and the combining beam may be selected in a set of beams orthogonal to the leading beam and the set of the beams orthogonal to the leading beam may be determined dependent on an uplink payload size for the CSI transmission.

According to an embodiment of the present disclosure, more accurate channel state information of a user equipment can be reported to a base station in a wireless communication system supporting a multi-antenna system.

Further, according to an embodiment of the present disclosure, in a wireless communication system supporting a multi-antenna system, in particular, when a linear combining codebook that combines beams in units of subbands is used, a feedback size of channel state information can be reduced.

Advantages which can be obtained in the present disclosure are not limited to the aforementioned effects and other unmentioned advantages will be clearly understood by those skilled in the art from the following description.

DESCRIPTION OF DRAWINGS

The accompanying drawings, which are included herein as a part of the description for help understanding the present disclosure, provide embodiments of the present disclosure, and describe the technical features of the present disclosure with the description below.

DETAILED DESCRIPTION

Figure 1A:
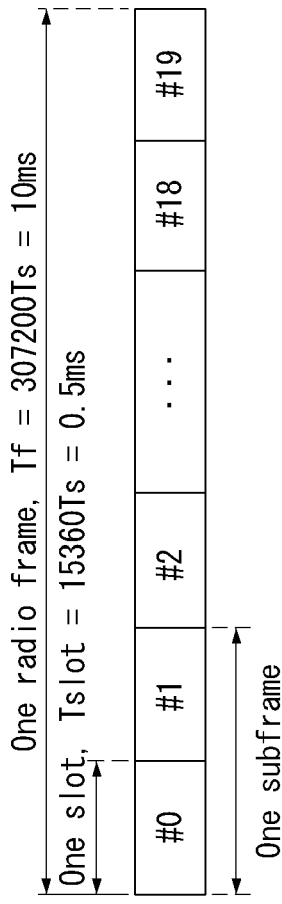
FIGS. 1A and 1B illustrate the structure of a radio frame in a wireless communication system to which the present disclosure may be applied.

Some embodiments of the present disclosure are described in detail with reference to the accompanying drawings. A detailed description to be disclosed along with the accompanying drawings are intended to describe some embodiments of the present disclosure and are not intended to describe a sole embodiment of the present disclosure. The following detailed description includes more details in order to provide full understanding of the present disclosure. However, those skilled in the art will understand that the present disclosure may be implemented without such more details.

In some cases, in order to avoid that the concept of the present disclosure becomes vague, known structures and devices are omitted or may be shown in a block diagram form based on the core functions of each structure and device.

In this specification, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a Base Transceiver System (BTS), or an access point (AP). Furthermore, the device may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present disclosure, and the use of such specific terms may be changed in various forms without departing from the technical sprit of the present disclosure.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

Embodiments of the present disclosure may be supported by the standard documents disclosed in at least one of IEEE 802, 3GPP, and 3GPP2, that is, radio access systems. That is, steps or portions that belong to the embodiments of the present disclosure and that are not described in order to clearly expose the technical spirit of the present disclosure may be supported by the documents. Furthermore, all terms disclosed in this document may be described by the standard documents.

In order to more clarify a description, 3GPP LTE/LTE-A is chiefly described, but the technical characteristics of the present disclosure are not limited thereto.

General system to which the present disclosure may be applied.

Figure 1B:
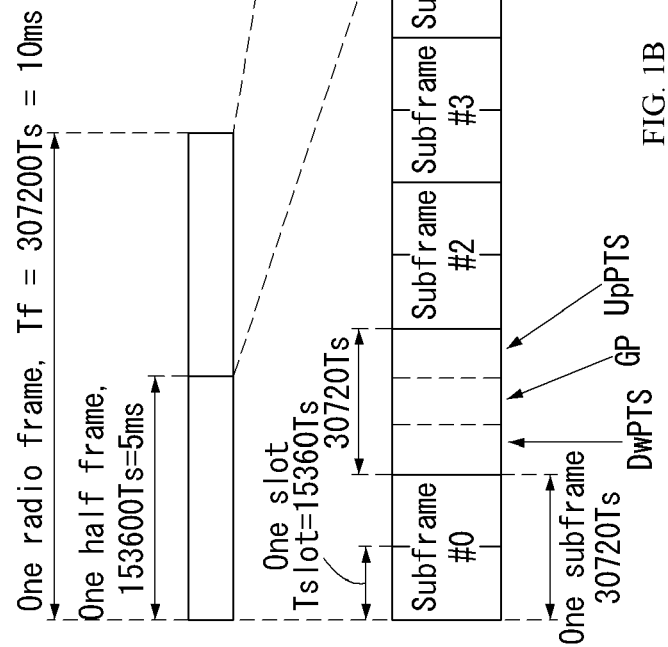

FIGS. 1A and 1B shows the structure of a radio frame in a wireless communication system to which an embodiment of the present disclosure may be applied.

3GPP LTE/LTE-A support a radio frame structure type 1 which may be applicable to Frequency Division Duplex (FDD) and a radio frame structure which may be applicable to Time Division Duplex (TDD).

The size of a radio frame in the time domain is represented as a multiple of a time unit of $T\_s=1/(15000*2048)$. A UL and DL transmission includes the radio frame having a duration of $T\_f=307200*T\_s=10$ ms.

FIG. 1A exemplifies a radio frame structure type 1. The type 1 radio frame may be applied to both of full duplex FDD and half duplex FDD.

A radio frame includes 10 subframes. A radio frame includes 20 slots of $T\_slot=15360*T\_s=0.5$ ms length, and 0 to 19 indexes are given to each of the slots. One subframe includes consecutive two slots in the time domain, and subframe i includes slot $2i$ and slot $2i+1$. The time required for transmitting a subframe is referred to as a transmission time interval (TTI). For example, the length of the subframe i may be 1 ms and the length of a slot may be 0.5 ms.

A UL transmission and a DL transmission I the FDD are distinguished in the frequency domain. Whereas there is no restriction in the full duplex FDD, a UE may not transmit and receive simultaneously in the half duplex FDD operation.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

FIG. 1B shows frame structure type 2.

A type 2 radio frame includes two half frame of $153600*T\_s=5$ ms length each. Each half frame includes 5 subframes of $30720*T\_s=1$ ms length.

In the frame structure type 2 of a TDD system, an uplink-downlink configuration is a rule indicating whether uplink and downlink are allocated (or reserved) to all subframes.

Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |

TABLE 1-continued

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, 'D' represents a subframe for a DL transmission, 'U' represents a subframe for UL transmission, and 'S' represents a special subframe including three types of fields including a Downlink Pilot Time Slot (DwPTS), a Guard Period (GP), and a Uplink Pilot Time Slot (UpPTS).

A DwPTS is used for an initial cell search, synchronization or channel estimation in a UE. A UpPTS is used for channel estimation in an eNB and for synchronizing a UL transmission synchronization of a UE. A GP is duration for removing interference occurred in a UL owing to multi-path delay of a DL signal between a UL and a DL.

Each subframe i includes slot 2i and slot 2i+1 of T_slot=15360*T_s=0.5 ms.

The UL-DL configuration may be classified into 7 types, and the position and/or the number of a DL subframe, a special subframe and a UL subframe are different for each configuration.

A point when the downlink is changed to the uplink or a point when the uplink is switched to the downlink is referred to as a switching point. Switch-point periodicity means a period in which an aspect in which the uplink subframe and the downlink subframe are switched is similarly repeated and both 5 ms and 10 ms are supported. When the downlink-downlink switch-point periodicity is 5 ms, the special subframe S exists for each half-frame and when the downlink-uplink switch-point periodicity is 5 ms, the special subframe S exists only in a first half-frame.

In all configurations, subframes #0 and #5 and the DwPTS are periods only for the downlink transmission. The UpPTS and the subframe and a subframe immediately following the subframe are always periods for the uplink transmission.

The uplink-downlink configuration as system information may be known by both the base station and the UE. The base station transmits only an index of configuration information whenever the configuration information is changed to notify the UE of a change of an uplink-downlink assignment state of the radio frame. Further, the configuration information as a kind of downlink control information may be transmitted through a physical downlink control channel (PDCCH) similar to another scheduling information and as broadcast information may be commonly transmitted to all UEs in a cell through a broadcast channel.

Table 2 represents configuration (length of DwPTS/GP/UpPTS) of a special subframe.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The structure of a radio subframe according to the example of FIG. 1 is just an example, and the number of subcarriers included in a radio frame, the number of slots included in a subframe and the number of OFDM symbols included in a slot may be changed in various manners.

Figure 2:
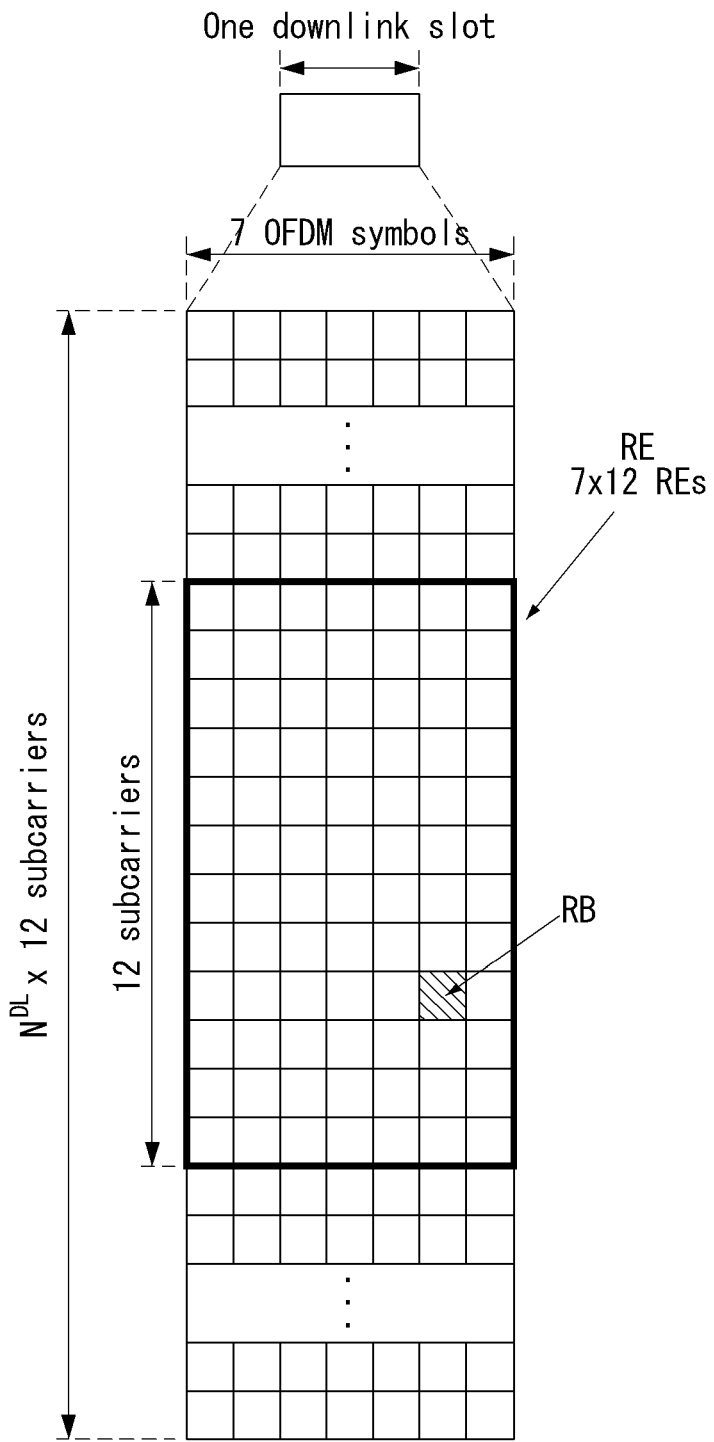
FIG. 2 is a diagram illustrating a resource grid for a downlink slot in a wireless communication system to which the present disclosure may be applied.

FIG. 2 is a diagram illustrating a resource grid for one downlink slot in a wireless communication system to which an embodiment of the present disclosure may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the present disclosure is not limited thereto.

Each element on the resource grid is referred to as a resource element, and one resource block (RB) includes 12×7 resource elements. The number of RBs NADL included in a downlink slot depends on a downlink transmission bandwidth.

The structure of an uplink slot may be the same as that of a downlink slot.

Figure 3:
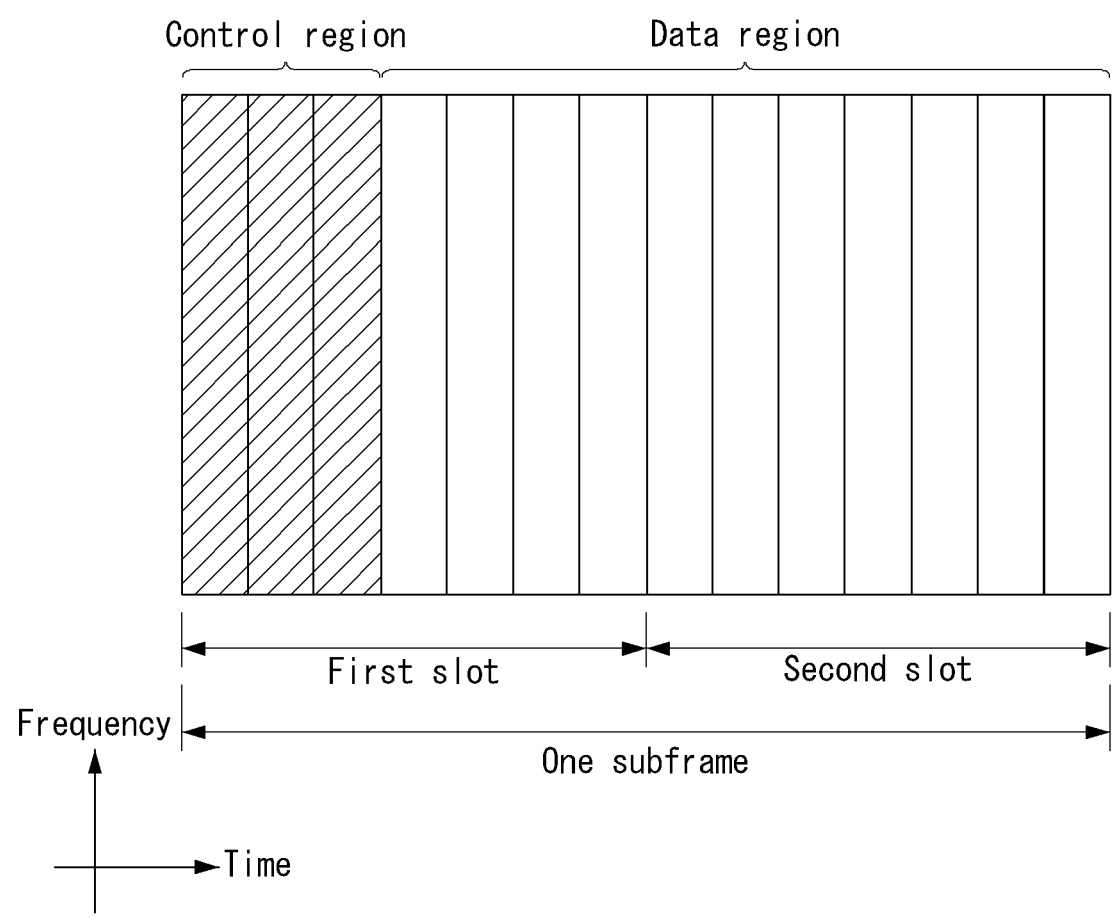
FIG. 3 illustrates a structure of downlink subframe in a wireless communication system to which the present disclosure may be applied.

FIG. 3 shows the structure of a downlink subframe in a wireless communication system to which an embodiment of the present disclosure may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

The PDCCH may carry resource allocation and a transmission format (also referred to as a downlink (DL) grant) of a downlink-shared channel (DL-SCH), resource allocation information (also referred to as an uplink (UL) grant) of an uplink shared channel (UL-SCH), paging information on a paging channel (PCH), system information on the DL-SCH, resource allocation of an upper layer control message such as a random access response transmitted on a PDSCH, activation of a set of transmission power control (TPC) commands for individual UEs in a predetermined UE group and a voice over Internet protocol (VoIP), and the like. A plurality of PDCCHs may be transmitted in the control region and the UE may monitor the plurality of PDCCHs. The PDCCH is configured by one control channel element or a set of a plurality of consecutive control channel elements (CCEs). The CCE is a logical allocation unit used for providing a coding rate depending on a state of a radio channel to the PDCCH. The CCE corresponds to a plurality of resource element groups. A format of the PDCCH and the number of bits of the PDCCH available are determined according to an association relationship between the number of CCEs and the coding rate provided by the CCEs.

The eNB decides a PDCCH format according to the DCI to be sent to the UE and attaches cyclic redundancy check (CRC) to the control information. The CRC is masked with a radio network temporary identifier (RNTI) according to an owner or a purpose of the PDCCH. The CRC may be masked with a unique identifier (e.g., cell-RNTI (C-RNTI)) of the UE in the case of the PDCCH for a specific UE. Alternatively, in the case of the PDCCH for the paging message, the CRC may be masked with a paging indication identifier (e.g., paging-RNTI (P-RNTI)). In the case of the PDCCH for system information, more specifically, a system information block (SIB), the CRC may be masked with a system information-RNTI (SI-RNTI). The CRC may be masked with a random access-RNTI (RA-RNTI) in order to indicate a random access response which is a response to transmission of a random access preamble of the UE.

Figure 4:
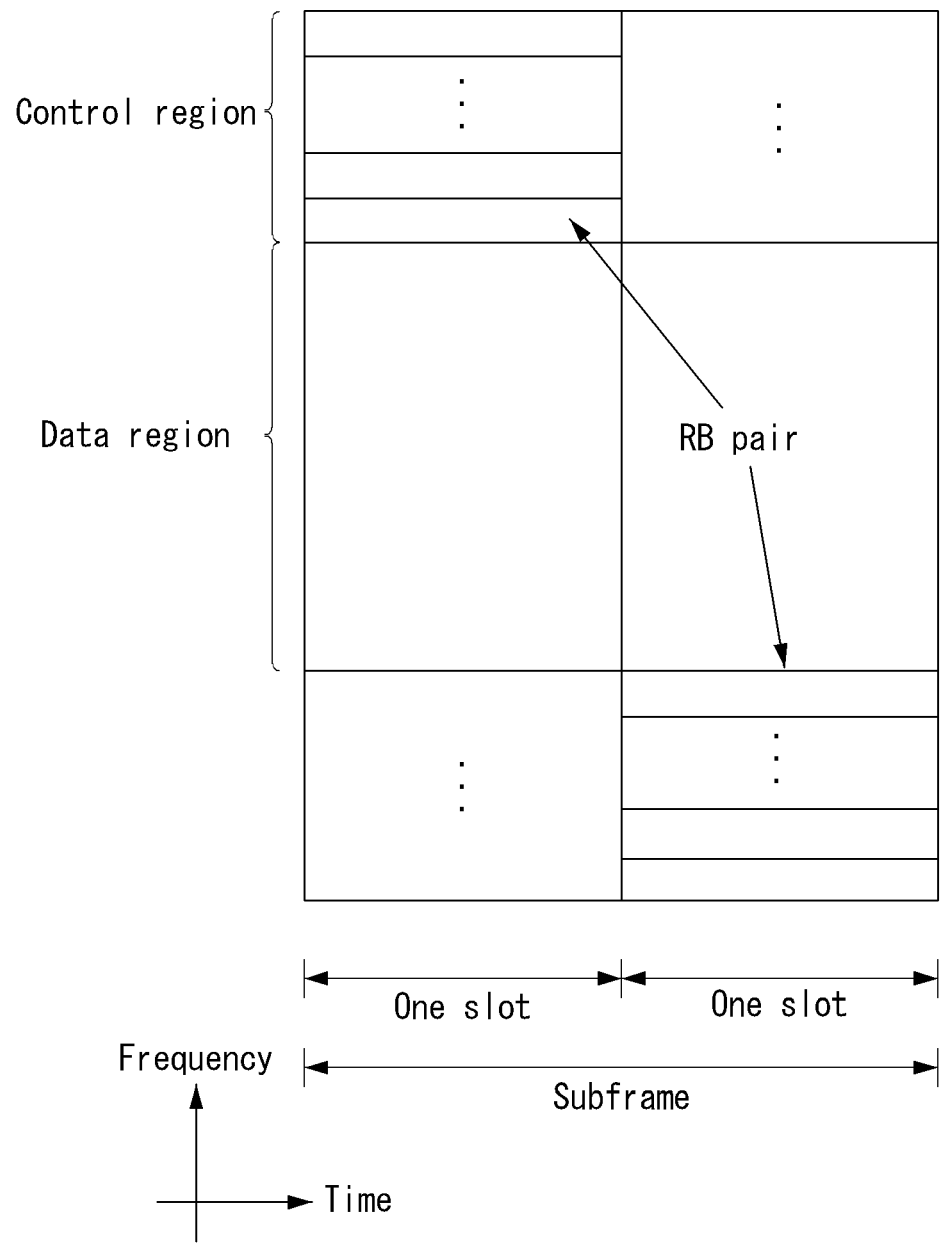
FIG. 4 illustrates a structure of uplink subframe in a wireless communication system to which the present disclosure may be applied.

FIG. 4 shows the structure of an uplink subframe in a wireless communication system to which an embodiment of the present disclosure may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Multi-Input Multi-Output (MIMO)

A MIMO technology does not use single transmission antenna and single reception antenna that have been commonly used so far, but uses a multi-transmission (Tx) antenna and a multi-reception (Rx) antenna. In other words, the MIMO technology is a technology for increasing a capacity or enhancing performance using multi-input/output antennas in the transmission end or reception end of a wireless communication system. Hereinafter, MIMO is called a "multi-input/output antenna.".

More specifically, the multi-input/output antenna technology does not depend on a single antenna path in order to receive a single total message and completes total data by collecting a plurality of data pieces received through several antennas. As a result, the multi-input/output antenna technology can increase a data transfer rate within a specific system range and can also increase a system range through a specific data transfer rate.

It is expected that an efficient multi-input/output antenna technology will be used because next-generation mobile communication requires a data transfer rate much higher than that of existing mobile communication. In such a situation, the MIMO communication technology is a next-generation mobile communication technology which may be widely used in mobile communication UE and a relay node and has been in the spotlight as a technology which may overcome a limit to the transfer rate of another mobile communication attributable to the expansion of data communication.

Meanwhile, the multi-input/output antenna (MIMO) technology of various transmission efficiency improvement technologies that are being developed has been most in the spotlight as a method capable of significantly improving a communication capacity and transmission/reception performance even without the allocation of additional frequencies or a power increase.

Figure 5:
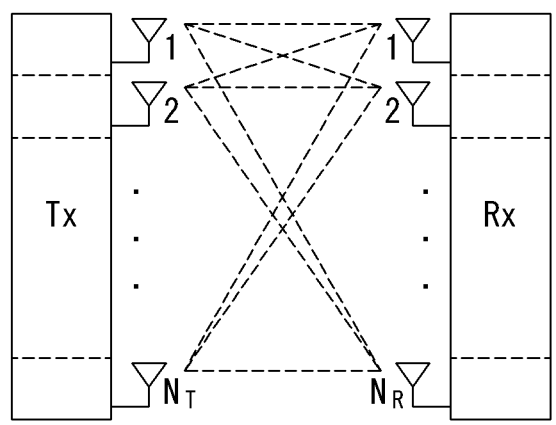
FIG. 5 shows the configuration of a known MIMO communication system.

FIG. 5 shows the configuration of a known MIMO communication system.

Referring to FIG. 5, if the number of transmission (Tx) antennas is increased to N_T and the number of reception (Rx) antennas is increased to N_R at the same time, a theoretical channel transmission capacity is increased in proportion to the number of antennas, unlike in the case where a plurality of antennas is used only in a transmitter or a receiver. Accordingly, a transfer rate can be improved, and frequency efficiency can be significantly improved. In this case, a transfer rate according to an increase of a channel transmission capacity may be theoretically increased by a value obtained by multiplying the following rate increment R_i by a maximum transfer rate R_o if one antenna is used.

$$R_i = \min(N_T, N_R) \quad \text{[Equation 1]}$$

That is, in an MIMO communication system using 4 transmission antennas and 4 reception antennas, for example, a quadruple transfer rate can be obtained theoretically compared to a single antenna system.

Such a multi-input/output antenna technology may be divided into a spatial diversity method for increasing transmission reliability using symbols passing through various channel paths and a spatial multiplexing method for improving a transfer rate by sending a plurality of data symbols at the same time using a plurality of transmission antennas. Furthermore, active research is being recently carried out on a method for properly obtaining the advantages of the two methods by combining the two methods.

Each of the methods is described in more detail below.

First, the spatial diversity method includes a space-time block code-series method and a space-time Trelis code-series method using a diversity gain and a coding gain at the same time. In general, the Trelis code-series method is better in terms of bit error rate improvement performance and the degree of a code generation freedom, whereas the space-time block code-series method has low operational complexity. Such a spatial diversity gain may correspond to an amount corresponding to the product (N_T×N_R) of the number of transmission antennas (N_T) and the number of reception antennas (N_R).

Second, the spatial multiplexing scheme is a method for sending different data streams in transmission antennas. In this case, in a receiver, mutual interference is generated between data transmitted by a transmitter at the same time. The receiver removes the interference using a proper signal processing scheme and receives the data. A noise removal method used in this case may include a Maximum Likelihood Detection (MLD) receiver, a Zero-Forcing (ZF) receiver, a Minimum Mean Square Error (MMSE) receiver, Diagonal-Bell Laboratories Layered Space-Time (D-BLAST), and Vertical-Bell Laboratories Layered Space-Time (V-BLAST). In particular, if a transmission end can be aware of channel information, a Singular Value Decomposition (SVD) method may be used.

Third, there is a method using a combination of a spatial diversity and spatial multiplexing. If only a spatial diversity gain is to be obtained, a performance improvement gain according to an increase of a diversity disparity is gradually saturated. If only a spatial multiplexing gain is used, transmission reliability in a radio channel is deteriorated. Methods for solving the problems and obtaining the two gains have been researched and may include a double space-time transmit diversity (double-STTD) method and a space-time bit interleaved coded modulation (STBICM).

In order to describe a communication method in a multi-input/output antenna system, such as that described above, in more detail, the communication method may be represented as follows through mathematical modeling.

First, as shown in FIG. 5, it is assumed that N_T transmission antennas and NR reception antennas are present.

First, a transmission signal is described below. If the N_T transmission antennas are present as described above, a maximum number of pieces of information which can be transmitted are N_T, which may be represented using the following vector.

$$s = [s_1, s_2, \ldots, s_{N_T}]^T \quad \text{[Equation 2]}$$

Meanwhile, transmission power may be different in each of pieces of transmission information s_1, s_2, . . . , s_NT. In this case, if pieces of transmission power are P_1, P_2, . . . , P_NT, transmission information having controlled transmission power may be represented using the following vector.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

Furthermore, transmission information having controlled transmission power in the Equation 3 may be represented as follows using the diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, the information vector having controlled transmission power in the Equation 4 is multiplied by a weight matrix W, thus forming N_T transmission signals x_1, x_2, . . . , x_NT that are actually transmitted. In this case, the weight matrix functions to properly distribute the transmission information to antennas according to a transport channel condition. The following may be represented using the transmission signals x_1, x_2, . . . , x_NT.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

In this case, w_ij denotes weight between the i-th transmission antenna and the j-th transmission information, and W is an expression of a matrix of the weight. Such a matrix W is called a weight matrix or precoding matrix.

Meanwhile, the transmission signal x, such as that described above, may be considered to be used in a case where a spatial diversity is used and a case where spatial multiplexing is used.

If spatial multiplexing is used, all the elements of the information vector s have different values because different signals are multiplexed and transmitted. In contrast, if the spatial diversity is used, all the elements of the information vector s have the same value because the same signals are transmitted through several channel paths.

A method of mixing spatial multiplexing and the spatial diversity may be taken into consideration. In other words, the same signals may be transmitted using the spatial diversity through 3 transmission antennas, for example, and the remaining different signals may be spatially multiplexed and transmitted.

If N_R reception antennas are present, the reception signals y_1, y_2, . . . , y_NR of the respective antennas are represented as follows using a vector y.

$$y = [y_1, y_2, \ldots, y_{N_R}]^T \quad \text{[Equation 6]}$$

Meanwhile, if channels in a multi-input/output antenna communication system are modeled, the channels may be classified according to transmission/reception antenna indices. A channel passing through a reception antenna i from a transmission antenna j is represented as h_ij. In this case, it is to be noted that in order of the index of h_ij, the index of a reception antenna comes first and the index of a transmission antenna then comes.

Several channels may be grouped and expressed in a vector and matrix form. For example, a vector expression is described below.

Figure 6:
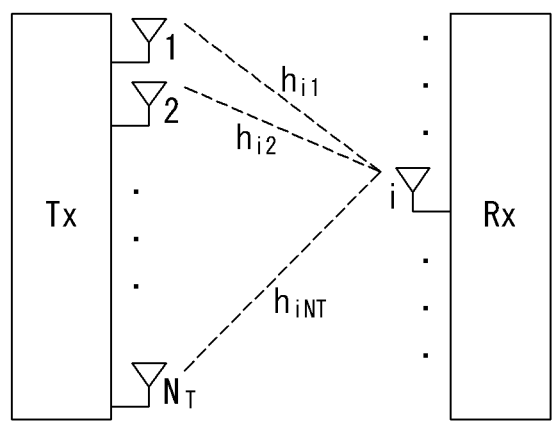
FIG. 6 is a diagram showing a channel from a plurality of transmission antennas to a single reception antenna.

FIG. 6 is a diagram showing a channel from a plurality of transmission antennas to a single reception antenna.

As shown in FIG. 6, a channel from a total of N_T transmission antennas to a reception antenna i may be represented as follows.

$$h_i^T [h_{i1}, h_{i2}, \ldots, h_{iN_T}] \quad \text{[Equation 7]}$$

Furthermore, if all channels from the N_T transmission antenna to NR reception antennas are represented through a matrix expression, such as Equation 7, they may be represented as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \vdots \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix} \quad \text{[Equation 8]}$$

Meanwhile, Additive White Gaussian Noise (AWGN) is added to an actual channel after the actual channel experiences the channel matrix H. Accordingly, AWGN n_1, n_2, . . . , n_NR added to the N_R reception antennas, respectively, are represented using a vector as follows.

$$n = [n_1, n_2, \ldots, n_{N_R}]^T \quad \text{[Equation 9]}$$

A transmission signal, a reception signal, a channel, and AWGN in a multi-input/output antenna communication system may be represented to have the following relationship through the modeling of the transmission signal, reception signal, channel, and AWGN, such as those described above.

$$y = \quad \text{[Equation 10]}$$

$$\begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} =$$

$$Hx + n$$

Meanwhile, the number of rows and columns of the channel matrix H indicative of the state of channels is determined by the number of transmission/reception antennas. In the channel matrix H, as described above, the number of rows becomes equal to the number of reception antennas N_R, and the number of columns becomes equal to the number of transmission antennas N_T. That is, the channel matrix H becomes an N_R×N_T matrix.

In general, the rank of a matrix is defined as a minimum number of the number of independent rows or columns. Accordingly, the rank of the matrix is not greater than the number of rows or columns. As for figural style, for example, the rank H of the channel matrix H is limited as follows.

$$\text{rank}(H) \leq \min(N_T, N_R) \quad \text{[Equation 11]}$$

Furthermore, if a matrix is subjected to Eigen value decomposition, a rank may be defined as the number of Eigen values that belong to Eigen values and that are not 0. Likewise, if a rank is subjected to Singular Value Decomposition (SVD), it may be defined as the number of singular values other than 0. Accordingly, the physical meaning of a rank in a channel matrix may be said to be a maximum number on which different information may be transmitted in a given channel.

In this specification, a "rank" for MIMO transmission indicates the number of paths through which signals may be independently transmitted at a specific point of time and a specific frequency resource. The "number of layers" indicates the number of signal streams transmitted through each path. In general, a rank has the same meaning as the number of layers unless otherwise described because a transmission end sends the number of layers corresponding to the number of ranks used in signal transmission.

Hereinafter, in association with the MIMO transmission techniques described above, a codebook based precoding technique will be described in more detail.

Figure 7:
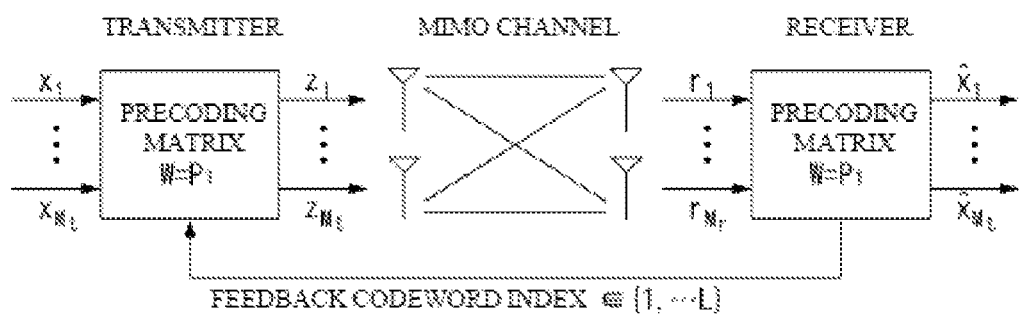
FIG. 7 is a diagram for describing a basic concept of codebook based precoding in a wireless communication system to which the present disclosure may be applied.

FIG. 7 is a diagram for describing a basic concept of codebook based precoding in a wireless communication system to which the present disclosure may be applied.

According to the codebook based precoding technique, the transmitting side an the receiving side share codebook information including a predetermined number of precoding matrixes according to a transmission rank, the number of antennas, and the like.

That is, when feedback information is infinite, the codebook based precoding technique may be used.

The receiving side measures the channel state through the received signal to feed back an infinite number of preferred precoding matrix information (that is, an index of the corresponding precoding matrix) to the transmitting side based on the codebook information. For example, the receiving side measures the received signal by a maximum likelihood (ML) or minimum mean square error (MMSE) technique to select the optimal precoding matrix.

It is illustrated that the receiving side transmits to the transmitting side the precoding matrix information for each codeword in FIG. 7, but the present disclosure need not be limited thereto.

The transmitting side that receives the feedback information from the receiving side may select a specific precoding matrix from the codebook based on the received information. The transmitting side that selects the precoding matrix may perform the precoding by a method that multiplies layer signals of a number corresponding to the transmission rank by the selected precoding matrix and transmit the transmitted signal of which precoding is performed through a plurality of antennas. In the precoding matrix, the number of rows is the same as the number of antennas and the number of columns is the same as a rank value. Since the rank value is the same as the number of layers, the number of columns is the same as the number of layers. For example, when the number of transmission antennas is 4 and the number of transmission layers is 2, the precoding matrix may be configured by a 4×2 matrix. Equation 12 below shows an operation of mapping information mapped to each layer to each antenna through the precoding matrix in such a case.

$$\begin{bmatrix} y_1 \\ y_2 \\ y_3 \\ y_4 \end{bmatrix} = \begin{bmatrix} p_{11} & y_1 \\ p_{12} & y_1 \\ p_{13} & y_1 \\ p_{14} & y_1 \end{bmatrix} \cdot \begin{bmatrix} x_1 \\ x_2 \end{bmatrix} \quad \text{[Equation 12]}$$

Referring to Equation 12, the information mapped to the layer is x_1 and x_2 and each element P_ij of the 4×2 matrix is a weight used for precoding. y_1, y_2, y_3, and y_4 which are information mapped to the antennas may be transmitted through the respective antennas using respective OFDM transmission schemes.

The receiving side that receives the signal precoded and transmitted by the transmitting side performs inverse processing of the precoding performed by the transmitting side to restore the received signal. In general, the precoding matrix satisfies a unitary matrix (U) condition such as U·U^H=I (here, U^H represents a matrix of matrix U), therefore, the inverse processing of the precoding may be performed by multiplying the received signal by Hermit matrix P^H of the precoding matrix P used for the precoding of the transmitting side.

Further, since the precoding is required to have good performance for various schemes of antenna configurations, it is necessary to consider the performance of various antenna configurations in a codebook design. Hereinafter, an exemplary configuration of multiple antennas will be described.

In the existing 3GPP LTE system (for example, a system according to the 3GPP LTE Release-8 or 9 standard), up to 4 transmission antennas are supported in the downlink, and as a result, a codebook for 4 transmission antennas is designed. The 3GPP LTE-A system, which is an evolution of the existing 3GPP LTE, may support up to 8 transmission antennas in the downlink. Therefore, it is required to design a precoding codebook that provides good performance for downlink transmission over up to 8 transmission antennas.

Further, in the codebook design, it is generally required to provide good performance for a constant modulus property, infinite alphabet, constraint on a codebook size, a nested property, and various antenna configurations.

The constant modulus property means a property in which an amplitude of each channel component of the precoding matrix constituting the codebook is constant. According to such a property, regardless of which precoding matrix is used, power levels transmitted from all antennas, respectively may be kept to be the same as each other. Thus, the efficiency of use of a power amplifier may be increased.

The infinite alphabet means, for example, that in the case of two transmission antennas, the precoding matrices are configured by using only a quadrature phase shift keying (QPSK) alphabet (i.e., ±1, ±j) except for a scaling factor. Thus, complexity of computation may be mitigated in multiplication of the precoding matrix by the precoder.

The codebook size may be constrained to a predetermined size or less. As the size of the codebook increases, the precoding matrices for various cases may be included, and as a result, the channel state may be more accurately reflected, but the number of bits of a precoding matrix indicator (PMI) increases, which may cause signaling overhead.

The nested property means that a part of a high-rank precoding matrix is configured by a low-rank precoding matrix. When the precoding matrix is configured as such, proper performance may be ensured even when the ENB determines to perform downlink transmission at a transmission rank lower than a channel rank indicated by a rank indicator (RI) reported from the UE. Further, according to such a property, the complexity of Channel Quality Information (CQI) computation may be reduced. The reason is that at the time of performing an operation of selecting the precoding matrix among precoding matrices designed for different ranks, a part of computation for selecting the precoding matrix may be shared.

Providing the good performance for various antenna configurations means that it is required to provide performance of a predetermined criterion or higher for various cases including an antenna configuration having a low correlation, an antenna configuration having a high correlation, or a cross-polarized antenna configuration.

Reference Signal (RS)

In a wireless communication system, a signal may be distorted during transmission because data is transmitted through a radio channel. In order for a reception end to accurately receive a distorted signal, the distortion of a received signal needs to be corrected using channel information. In order to detect channel information, a method of detecting channel information using the degree of the distortion of a signal transmission method and a signal known to both the transmission side and the reception side when they are transmitted through a channel is chiefly used. The aforementioned signal is called a pilot signal or reference signal (RS).

Furthermore recently, when most of mobile communication systems transmit a packet, they use a method capable of improving transmission/reception data efficiency by adopting multiple transmission antennas and multiple reception antennas instead of using one transmission antenna and one reception antenna used so far. When data is transmitted and received using multiple input/output antennas, a channel state between the transmission antenna and the reception antenna must be detected in order to accurately receive the signal. Accordingly, each transmission antenna must have an individual reference signal.

In a mobile communication system, an RS may be basically divided into two types depending on its object. There are an RS having an object of obtaining channel state information and an RS used for data demodulation. The former has an object of obtaining, by a UE, to obtain channel state information in the downlink. Accordingly, a corresponding RS must be transmitted in a wideband, and a UE must be capable of receiving and measuring the RS although the UE does not receive downlink data in a specific subframe. Furthermore, the former is also used for radio resources management (RRM) measurement, such as handover. The latter is an RS transmitted along with corresponding resources when an eNB transmits the downlink. A UE may perform channel estimation by receiving a corresponding RS and thus may demodulate data. The corresponding RS must be transmitted in a region in which data is transmitted.

A downlink RS includes one common RS (CRS) for the acquisition of information about a channel state shared by all of UEs within a cell and measurement, such as handover, and a dedicated RS (DRS) used for data demodulation for only a specific UE. Information for demodulation and channel measurement can be provided using such RSs. That is, the DRS is used for only data demodulation, and the CRS is used for the two objects of channel information acquisition and data demodulation.

The reception side (i.e., UE) measures a channel state based on a CRS and feeds an indicator related to channel quality, such as a channel quality indicator (CQI), a precoding matrix index (PMI) and/or a rank indicator (RI), back to the transmission side (i.e., an eNB). The CRS is also called a cell-specific RS. In contrast, a reference signal related to the feedback of channel state information (CSI) may be defined as a CSI-RS.

The DRS may be transmitted through resource elements if data on a PDSCH needs to be demodulated. A UE may receive information about whether a DRS is present through a higher layer, and the DRS is valid only if a corresponding PDSCH has been mapped. The DRS may also be called a UE-specific RS or demodulation RS (DMRS).

Figure 8A:
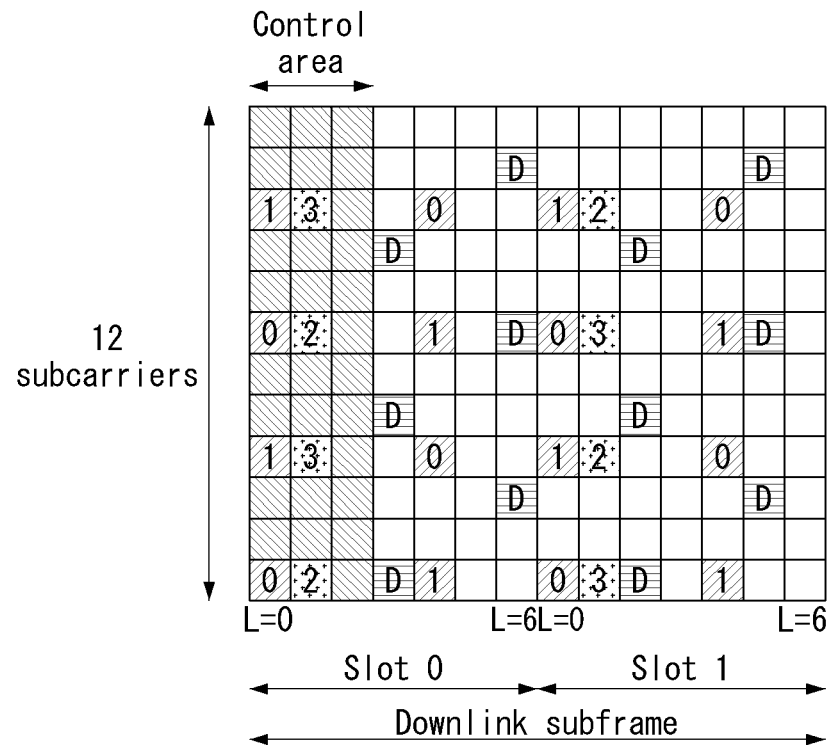
FIGS. 8A and 8B illustrate a reference signal pattern mapped to a downlink resource block pair in a wireless communication system to which the present disclosure may be applied.
Figure 8B:
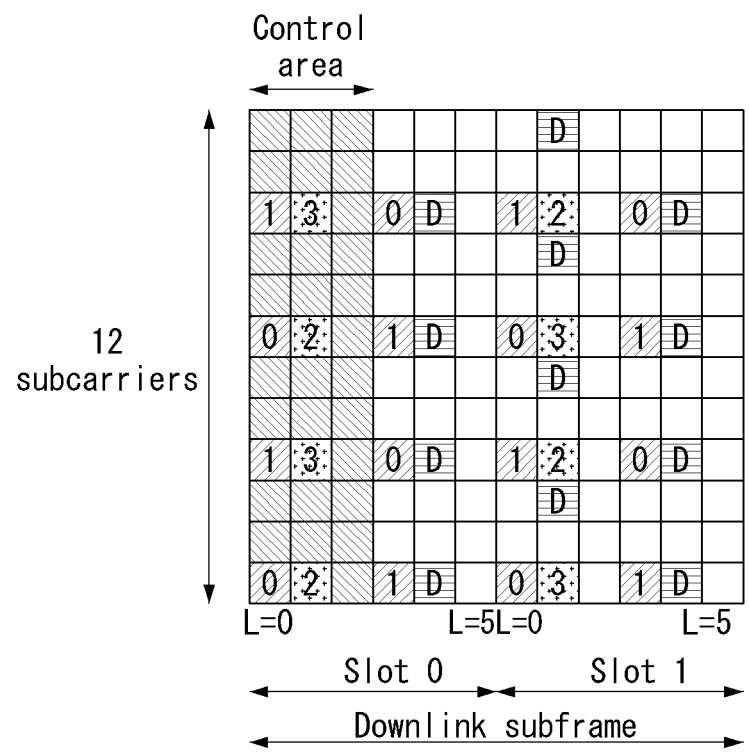

FIGS. 8A and 8B illustrate reference signal patterns mapped to downlink resource block pairs in a wireless communication system to which the present disclosure may be applied.

Referring to FIGS. 8A and 8B, a downlink resource block pair, that is, a unit in which a reference signal is mapped, may be represented in the form of one subframe in a time domain X 12 subcarriers in a frequency domain. That is, in a time axis (an x axis), one resource block pair has a length of 14 OFDM symbols in the case of a normal cyclic prefix (CP) (FIG. 8A) and has a length of 12 OFDM symbols in the case of an extended cyclic prefix (CP) (FIG. 8B). In the resource block lattice, resource elements (REs) indicated by "0", "1", "2", and "3" mean the locations of the CRSs of antenna port indices "0", "1", "2", and "3", respectively, and REs indicated by "D" mean the location of a DRS.

Hereinafter, when the CRS is described in more detail, the CRS is used for estimating the channel of the physical antenna and is distributed in an entire frequency band as a reference signal which may be commonly received by all UEs positioned in the cell. That is, the CRS as a cell-specific signal is transmitted every subframe for a wideband. Further, the CRS may be used for the channel quality information (CSI) and the data demodulation.

The CRS is defined in various formats according to an antenna array at the transmitting side (eNB). In the 3GPP LTE system (e.g., release-8), the RSs are transmitted based on maximum 4 antenna ports depending on the number of transmission antennas of the eNB. The transmitting side of the downlink signal has three types of antenna arrays such as a single transmission antenna, two transmission antennas, and four transmission antennas. For instance, in case that the number of the transmission antennas of the base station is 2, CRSs for antenna #0 and antenna #1 are transmitted. For another instance, in case that the number of the transmission antennas of the base station is 4, CRSs for antennas #0 to #3 are transmitted. When the number of transmission antennas of the eNB, the CRS pattern in one RB is illustrated in FIGS. 8A and 8B.

When the eNB uses the single transmitting antenna, reference signals for the single antenna port are arrayed.

When the eNB uses two transmitting antennas, the reference signals for two transmitting antenna ports are arrayed by using a time division multiplexing (TDM) and/or frequency division multiplexing (FDM) scheme. That is, the reference signals for the two antenna ports are allocated different time resources and/or different frequency resources, respectively, to be distinguished.

Moreover, when the eNB uses four transmitting antennas, the reference signals for four transmitting antenna ports are arrayed by using the TDM and/or FDM scheme. Channel information measured by the receiving side (UE) of the downlink signal may be used for demodulating data transmitted by using a transmission scheme such as single transmitting antenna transmission, transmission diversity, closed-loop spatial multiplexing, open-loop spatial multiplexing, or multi-user multi-input multi-output (MIMO).

In the case where a multi-input/multi-output antenna is supported, when the reference signal is transmitted from a specific antenna port, the reference signal is transmitted to the locations of the resource elements specified according to the pattern of the reference signal and the reference signal is not transmitted to the locations of the resource elements specified for another antenna port. That is the reference signals between different antennas do not overlap with each other.

Hereinafter, when the DRS is described in more detail, the DRS is used for demodulating data. A precoding weight used for a specific UE in MIMO transmission is used without any change in order to estimate a channel corresponding in combination with the transport channel transmitted in each transmission antenna when the UE receives the reference signal.

The 3GPP LTE system (e.g., Release-8) supports up to four transmission antennas and the DRS for rank 1 beamforming is defined. The DRS for rank 1 beamforming also indicates a reference signal for antenna port index 5.

An LTE-A system which is an evolved and developed type of the LTE system should be designed to support a maximum of eight transmit antennas in the downlink of the eNB. Therefore, RSs for up to eight transmit antennas should also be supported. In respect to, the downlink RS in the LTE system, since only RSs for a maximum of four antenna ports are defined, when the eNB has 4 to 8 downlink transmit antennas in the LTE-A system, the RSs for the antenna ports should be additionally defined and designed. In respect to the RSs for a maximum of eight transmit antenna ports, both the RS for channel measurement described above and the RS for data demodulation should be designed.

One of important considerations in designing the LTE-A system is backward compatibility, i.e., the LTE UE should operate well even in the LTE-A system and the system should also support the operation. From the viewpoint of RS transmission, RSs for a maximum of eight transmit antenna ports should be additionally defined in the time-frequency domain in which the CRS defined in LTE is transmitted every subframe over the entire band. In the LTE-A system, if RS patterns for a maximum of eight transmit antennas are transmitted to the entire band every subframe by the same scheme as the CRS of the existing LTE, RS overhead becomes too great.

Therefore, the newly designed RSs in the LTE-A system are generally classified into two categories, i.e., RSs (Channel State Information-RS (CSI-RS), Channel State Indication-RS (CSI-RS), etc.) for channel measurement purpose for selecting MCS and PMI and RSs (Data Demodulation-RS (DM-RS)) for demodulating data transmitted by eight transmit antennas.

CSI-RS for the purpose of channel measurement has a feature of being designed for channel measurement-oriented purposes, unlike the existing CRS is used for data demodulation at the same time as the channel measurement, measurement of handover, and the like, etc. Of course, this may also be used for the purpose of measuring handover and the like. Since the CSI-RS is transmitted only for obtaining the channel state information, unlike the CRS, the CSI-RS does not need to be transmitted every subframe. In order to reduce the overhead of the CSI-RS, the CSI-RS is transmitted intermittently on the time axis.

The DM-RS is dedicatedly transmitted to the UE which is scheduled in the corresponding time-frequency domain for data demodulation. In other words, the DM-RS of a specific UE is only transmitted to the region where the corresponding user equipment is scheduled, i.e., the time-frequency domain that receives data.

The LTE-A system supports maximum eight transmitting antennas for downlink transmission. In the LTE-A system, if reference signals for maximum eight transmitting antennas are transmitted to full band per subframe in the same manner as the CRS of the existing LTE system, the RS overhead becomes too great. Accordingly, the reference signal in the LTE-A system may be divided into a CSI-RS for CSI measurement for selecting MCS, PMI, or the like and a DM-RS for data demodulation and two RSs are thus added. The CSI-RS may be used for the purpose such as the RRM measurement, or the like, but is designed for a main purpose of the CSI acquisition. Since the CSI-RS is not for the data demodulation, the CSI-RS need not be transmitted every subframe. Accordingly, in order to reduce overhead, the CSI-RS may intermittently be transmitted on the time axis. That is, the CSI-RS may be periodically transmitted with a period of an integer multiple of one subframe or may be transmitted in a specific transmission pattern. At this time, the period or pattern in which the CSI-RS is transmitted may be configured by the eNB.

The DM-RS is dedicatedly transmitted to the UE which is scheduled in the corresponding time-frequency domain for data demodulation. In other words, the DM-RS of a specific UE is only transmitted to the region where the corresponding user equipment is scheduled, i.e., the time-frequency domain that receives data.

In order to measure the CSI-RS, the UE should know a transmission subframe index of the CSI-RS for each CSI-RS antenna port of the cell to which the UE belongs, a CSI-RS resource element (RE) time-frequency position within a transmission subframe, and information on a CSI-RS sequence.

In the LTE-A system, the eNB should transmit the CSI-RS for each of up to eight antenna ports. Resources used for CSI-RS transmission of different antenna ports should be orthogonal to each other. When an eNB transmits CSI-RSs for different antenna ports, the resources may be orthogonally allocated in an FDM/TDM scheme by mapping the CSI-RSs for each antenna port to different REs. Alternatively, the CSI-RSs for different antenna ports may be transmitted in the CDM scheme of mapping the CSI-RSs to codes orthogonal to each other.

When the eNB informs a cell UE thereof of the information on the CSI-RS, the eNB should first inform the information ON the time-frequency to which the CSI-RS for each antenna port is mapped. Specifically, the information includes the subframe numbers through which the CSI-RS is transmitted, or the period during which the CSI-RS is transmitted, the subframe offset through which the CSI-RS is transmitted, and the OFDM symbol number where the CSI-RS RE of a specific antenna is transmitted, a frequency spacing, an RE offset or shift value on the frequency axis, etc.

The CSI-RS is transmitted through one, two, four, or eight antenna ports. In this case, the used antenna ports are p=15, p=15,16, p=15, . . . ,18, p=15, . . . ,22, respectively. The CSI-RS may be defined only for the subcarrier spacing Δf=15 kHz.

Within a subframe configured for CSI-RS transmission, a CSI-RS sequence is mapped to a complex-valued modulation symbol a_kl^(p) used as a reference symbol on each antenna port p as shown in Equation 13 below.

$$a^{(p)}_{k,l} = w_{l''} \cdot r_{l,n_s}(m') \qquad \text{[Equation 13]}$$

$$k = k' + 12m +
\begin{cases}
-0 & \text{for } p \in \{15, 16\}, \text{ normal cyclic prefix} \\
-6 & \text{for } p \in \{17, 18\}, \text{ normal cyclic prefix} \\
-1 & \text{for } p \in \{19, 20\}, \text{ normal cyclic prefix} \\
-7 & \text{for } p \in \{21, 22\}, \text{ normal cyclic prefix} \\
-0 & \text{for } p \in \{15, 16\}, \text{ extended cyclic prefix} \\
-3 & \text{for } p \in \{17, 18\}, \text{ extended cyclic prefix} \\
-6 & \text{for } p \in \{19, 20\}, \text{ extended cyclic prefix} \\
-9 & \text{for } p \in \{21, 22\}, \text{ extended cyclic prefix}
\end{cases}$$

$$l = l' +
\begin{cases}
l'' & \text{CSI reference signal configurations } 0-19, \text{ normal cyclic prefix} \\
2l'' & \text{CSI reference signal configurations } 20-31, \text{ normal cyclic prefix} \\
l'' & \text{CSI reference signal configurations } 0-27, \text{ extended cyclic prefix}
\end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

In Equation 13, (k', l') (where k' represents a subcarrier index in a resource block and l' represents an OFDM symbol index in a slot) and a condition of n_s is determined according to a CSI-RS configuration shown in Table 3 or 4 below.

Table 3 shows the mapping of (k',l') from the CSI-RS configuration in the normal CP.

TABLE 3

| CSI reference signal config- uration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| Frame structure type 1 and 2 | | | | | | |
| 0 | (9, 5) | 0 | (9, 5) | 0 | (9, 5) | 0 |
| 1 | (11, 2) | 1 | (11, 2) | 1 | (11, 2) | 1 |
| 2 | (9, 2) | 1 | (9, 2) | 1 | (9, 2) | 1 |
| 3 | (7, 2) | 1 | (7, 2) | 1 | (7, 2) | 1 |
| 4 | (9, 5) | 1 | (9, 5) | 1 | (9, 5) | 1 |
| 5 | (8, 5) | 0 | (8, 5) | 0 | | |
| 6 | (10, 2) | 1 | (10, 2) | 1 | | |
| 7 | (8, 2) | 1 | (8, 2) | 1 | | |
| 8 | (6, 2) | 1 | (6, 2) | 1 | | |
| 9 | (8, 5) | 1 | (8, 5) | 1 | | |
| 10 | (3, 5) | 0 | | | | |
| 11 | (2, 5) | 0 | | | | |
| 12 | (5, 2) | 1 | | | | |
| 13 | (4, 2) | 1 | | | | |
| 14 | (3, 2) | 1 | | | | |
| 15 | (2, 2) | 1 | | | | |
| 16 | (1, 2) | 1 | | | | |

TABLE 3-continued

| CSI reference signal config-uration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| 17 | (0, 2) | 1 | | | | |
| 18 | (3, 5) | 1 | | | | |
| 19 | (2, 5) | 1 | | | | |
| Frame structure type 2 only 20 | (11, 1) | 1 | (11, 1) | 1 | (11, 1) | 1 |
| 21 | (9, 1) | 1 | (9, 1) | 1 | (9, 1) | 1 |
| 22 | (7, 1) | 1 | (7, 1) | 1 | (7, 1) | 1 |
| 23 | (10, 1) | 1 | (10, 1) | 1 | | |
| 24 | (8, 1) | 1 | (8, 1) | 1 | | |
| 25 | (6, 1) | 1 | (6, 1) | 1 | | |
| 26 | (5, 1) | 1 | | | | |
| 27 | (4, 1) | 1 | | | | |
| 28 | (3, 1) | 1 | | | | |
| 29 | (2, 1) | 1 | | | | |
| 30 | (1, 1) | 1 | | | | |
| 31 | (0, 1) | 1 | | | | |

Table 4 shows the mapping of (k', l') from the CSI-RS configuration in the extended CP.

TABLE 4

| CSI reference signal config-uration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| Frame structure type 1 and 2   0 | (11, 4) | 0 | (11, 4) | 0 | (11, 4) | 0 |
| 1 | (9, 4) | 0 | (9, 4) | 0 | (9, 4) | 0 |
| 2 | (10, 4) | 1 | (10, 4) | 1 | (10, 4) | 1 |
| 3 | (9, 4) | 1 | (9, 4) | 1 | (9, 4) | 1 |
| 4 | (5, 4) | 0 | (5, 4) | 0 | | |
| 5 | (3, 4) | 0 | (3, 4) | 0 | | |
| 6 | (4, 4) | 1 | (4, 4) | 1 | | |
| 7 | (3, 4) | 1 | (3, 4) | 1 | | |
| 8 | (8, 4) | 0 | | | | |
| 9 | (6, 4) | 0 | | | | |
| 10 | (2, 4) | 0 | | | | |
| 11 | (0, 4) | 0 | | | | |
| 12 | (7, 4) | 1 | | | | |
| 13 | (6, 4) | 1 | | | | |
| 14 | (1, 4) | 1 | | | | |
| 15 | (0, 4) | 1 | | | | |
| Frame structure type 2 only  16 | (11, 1) | 1 | (11, 1) | 1 | (11, 1) | 1 |
| 17 | (10, 1) | 1 | (10, 1) | 1 | (10, 1) | 1 |
| 18 | (9, 1) | 1 | (9, 1) | 1 | (9, 1) | 1 |
| 19 | (5, 1) | 1 | (5, 1) | 1 | | |
| 20 | (4, 1) | 1 | (4, 1) | 1 | | |
| 21 | (3, 1) | 1 | (3, 1) | 1 | | |
| 22 | (8, 1) | 1 | | | | |
| 23 | (7, 1) | 1 | | | | |
| 24 | (6, 1) | 1 | | | | |
| 25 | (2, 1) | 1 | | | | |
| 26 | (1, 1) | 1 | | | | |
| 27 | (0, 1) | 1 | | | | |

Referring to Tables 3 and 4, in the transmission of the CSI-RS, up to 32 (in the case of the normal CP) or up to 28 (in the case of the extended CP) different configurations are defined in order to reduce inter-cell interference (ICI) in a multi-cell environment, including a heterogeneous network (HetNet) environment.

The CSI-RS configuration is different depending on the number of antenna ports and the CP in the cell, and adjacent cells may have different configurations as much as possible. In addition, the CSI-RS configuration may be divided into a case of applying to both the FDD frame and the TDD frame and a case of applying only to the TDD frame according to the frame structure.

Based on Table 3 and Table 4, (k', l') and n_s are determined according to the CSI-RS configuration, and time-frequency resources used for CSI-RS transmission are determined according to each CSI-RS antenna port.

Figure 9A:
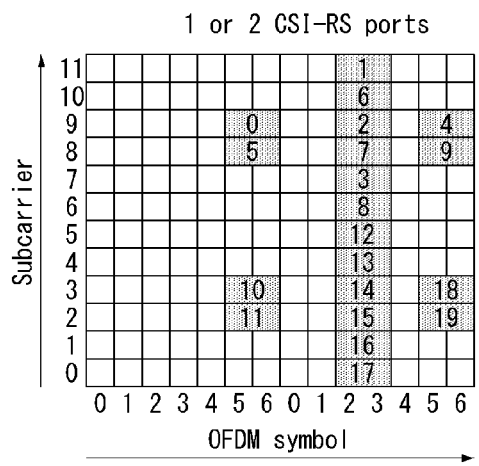
FIGS. 9A through 9C illustrate resources to which reference signals are mapped in a wireless communication system to which the present disclosure is applicable.
Figure 9B:
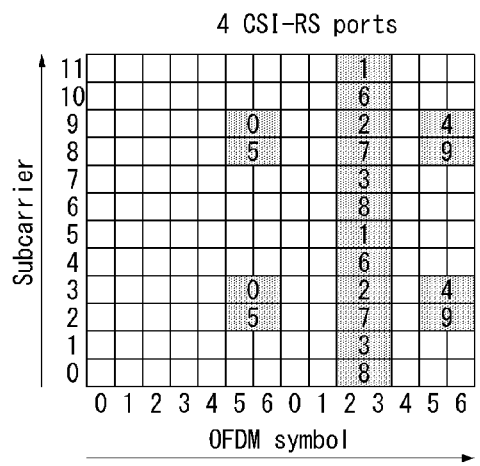
Figure 9C:
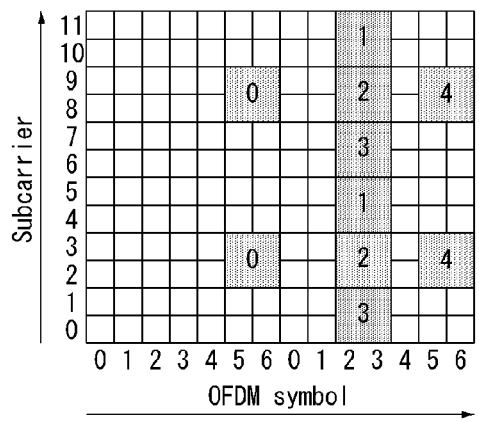

FIGS. 9A through 9C illustrate resources to which reference signals are mapped in a wireless communication system to which the present disclosure is applicable.

FIG. 9A illustrates shows 20 CSI-RS configurations available for CSI-RS transmission by one or two CSI-RS antenna ports, FIG. 9B illustrates 10 CSI-RS configurations available by four CSI-RS antenna ports, and FIG. 9C illustrates 5 CSI-RS configurations available for CSI-RS transmission by eight CSI-RS antenna ports.

As such, the radio resource (i.e., RE pair) in which the CSI-RS is transmitted is determined according to each CSI-RS configuration.

When one or two antenna ports are configured for CSI-RS transmission for a specific cell, the CSI-RS is transmitted on the radio resource according to the configured CSI-RS configuration among 20 CSI-RS configurations illustrated in FIG. 9A.

Similarly, when four antenna ports are configured for CSI-RS transmission for a specific cell, the CSI-RS is transmitted on the radio resource according to the configured CSI-RS configuration among 10 CSI-RS configurations illustrated in FIG. 9B. Further, when eight antenna ports are configured for CSI-RS transmission for a specific cell, the CSI-RS is transmitted on the radio resource according to the configured CSI-RS configuration among 5 CSI-RS configurations illustrated in FIG. 9C.

The CSI-RS for each antenna is CDMed and transmitted to the same radio resource for each of two antenna ports (i.e., {15,16}, {17,18}, {19,20}, {21,22}). For example, for antenna ports 15 and 16, respective CSI-RS complex symbols for antenna ports 15 and 16 are the same, but different orthogonal codes (e.g., Walsh codes) are multiplied to be mapped to the same radio resource. The CSI-RS complex symbol for antenna port 15 is multiplied by [1, 1] and the CSI-RS complex symbol for antenna port 16 is multiplied by [1, −1] to be mapped to the same radio resource. The same applies even to antenna ports {17,18}, {19,20}, and {21, 22}.

The UE may detect the CSI-RS for a specific antenna port by multiplying the transmitted symbol by the multiplied code. That is, the multiplied code [11] is multiplied to detect the CSI-RS for antenna port 15, and the multiplied code [1−1] is multiplied to detect the CSI-RS for antenna port 16.

Referring to FIGS. 9A to 9C, when the radio resource corresponds to the same CSI-RS configuration index, the radio resources according to the CSI-RS configuration having a large number of antenna ports includes the radio resources according to the CSI-RS configuration having a small number of CSI-RS antenna ports. For example, in the case of CSI-RS configuration 0, the radio resources for 8 antenna ports include both radio resources for 4 antenna ports and radio resources for one or two antenna ports.

A plurality of CSI-RS configurations may be used in one cell. For non-zero power (NZP) CSI-RS, only zero or one CSI-RS configuration may be used and for zero power (ZP) CSI-RS, zero or multiple CSI-RS configurations may be used.

For each bit configured to 1 in ZeroPowerCSI-RS (ZP CSI-RS), which is a bitmap of 16 bits configured by the higher layer, the UE assumes zero transmission power in REs (a case of being duplicated with the RE assuming the NZP CSI-RS configured by the higher layer is excluded) corresponding to four CSI-RS columns of Tables 3 and 4 above. A Most Significant Bit (MSB) corresponds to a lowest CSI-RS configuration index and a next bit in the bitmap corresponds to a next CSI-RS configuration index in order.

The CSI-RS is transmitted only in a downlink slot that satisfies the condition of (n_s mod 2) in Tables 3 and 4 and a subframe that satisfies the CSI-RS subframe configuration.

In the case of frame structure type 2 (TDD), the CSI-RS is not transmitted in subframes configured for subframe or paging message transmission which conflicts with transmission of a special subframe, a synchronization signal (SS), PBCH, or SystemInformationBlockType1 (SIB 1).

Further, an RE is not used for CSI-RS transmission of the PDSCH or another antenna port, in which the CSI-RS for any antenna port which belongs to antenna port set S (S={15}, S={15, 16}, S={17, 18}, S={19, 20}, or S={21, 22}) is transmitted.

Since time-frequency resources used for CSI-RS transmission may not be used for data transmission, data throughput decreases as CSI-RS overhead increases. In consideration of this, the CSI-RS is not configured to be transmitted every subframe, but is configured to be transmitted at a predetermined transmission period corresponding to multiple subframes. In this case, the CSI-RS transmission overhead may be much lower than that in the case where the CSI-RS is transmitted every subframe.

A subframe period (hereinafter, referred to as a 'CSI transmission period') (T_CSI-RS) and a subframe offset (Δ_CSI-RS) for CSI-RS transmission are shown in Table 5 below.

Table 5 shows a CSI-RS subframe configuration.

TABLE 5

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
| --- | --- | --- |
| 0-4 | 5 | $I_{CSI-RS}$ |
| 5-14 | 10 | $I_{CSI-RS} - 5$ |
| 15-34 | 20 | $I_{CSI-RS} - 15$ |
| 35-74 | 40 | $I_{CSI-RS} - 35$ |
| 75-154 | 80 | $I_{CSI-RS} - 75$ |

Referring to Table 5, the CSI-RS transmission period (T_CSI-RS) and the subframe offset (Δ_CSI-RS) are determined according to the CSI-RS subframe configuration (I_CSI-RS).

The CSI-RS subframe configuration of Table 5 may be configured to any one of a 'SubframeConfig' field and a 'zeroTxPowerSubframeConfig' field. The CSI-RS subframe configuration may be configured separately for the NZP CSI-RS and the ZP CSI-RS.

The subframe including the CSI-RS satisfies Equation 14 below.

$$(10 n_f + \lfloor n_s/2 \rfloor - \Delta_{CSI-RS}) \bmod T_{CSI-RS} = 0 \quad \text{[Equation 14]}$$

In Equation 14, T_CSI-RS denotes a CSI-RS transmission period, Δ_CSI-RS denotes a subframe offset value, n_f denotes a system frame number, and n_s denotes a slot number.

In the case of the UE in which transmission modes 9 is configured with respect to the serving cell, one CSI-RS resource configuration may be configured in the UE. In the case of the UE in which transmission modes 10 is configured with respect to the serving cell, one or more CSI-RS resource configuration(s) may be configured in the UE.

In the current LTE standard, the CSI-RS configuration is constituted by antennaPortsCount, subframeConfig, resourceConfig, etc., and indicates how many antenna ports the CSI-RS is transmitted from, how the periodicity and offset of the subframe to be transmitted by the CSI-RS, and at which RE position (frequency and OFDM symbol index) in the corresponding subframe the CSI-RS is transmitted.

Specifically, parameters for each CSI-RS (resource) configuration are configured through higher layer signaling as follows.

When transmission mode 10 is configured, a CSI-RS resource configuration identifier CSI-RS port count (antennaPortsCount): Parameters (e.g., 1 CSI-RS port, 2 CSI-RS port, 4 CSI-RS port, and 8 CSI-RS port) indicating the number of antenna ports used for CSI-RS transmission CSI-RS configuration (resourceConfig) (see Tables 3 and 4): Parameter for CSI-RS allocation resource position CSI-RS subframe configuration (subframeConfig, i.e., I_CSI-RS) (see Table 5): Parameter for subframe period and offset in which CSI-RS is to be transmitted When transmission mode 9 is configured, transmission power for CSI feedback (P_C): With respect to the assumption of the UE for the reference PDSCH transmission power for feedback, when the UE derives the CSI feedback and takes a value within the [−8, 15] dB range in 1 dB step size, P_C is assumed as a ratio of energy per PDSCH RE (Energy Per Resource Element (EPRE)) and CSI-RS EPRE.

When transmission mode 10 is configured, transmission power for CSI feedback with respect to each CSI process (P_C): When CSI subframe sets C_CSI,0 and C_CSI,1 are configured with respect to the CSI process by the higher layer, P_C is configured for each CSI subframe set of the CSI process.

Pseudo-random sequence generator parameter (n_ID)

When transmission mode 10 is configured, QCL scrambling identity for QuasiCo-Located (QCL) type B UE assumption (qcl-ScramblingIdentity-r11), CRS port count (crs-PortsCount-r11), higher layer parameter ('qcl-CRS-Info-r11') including an MBSFN subframe configuration list (mbsfn-SubframeConfigList-r11) parameter When the CSI feedback value derived by the UE has a value within the [−8, 15] dB range, P_C is assumed as the ratio of PDSCH EPRE to CSI-RS EPRE. Here, the PDSCH EPRE corresponds to a symbol in which the ratio of the PDSCH EPRE to the CRS EPRE is ρ_A.

The CSI-RS and the PMCH are not configured together in the same subframe of the serving cell.

When four CRS antenna ports are configured in frame structure type 2, in the UE, a CSI-RS configuration index which belongs to a set [20-31] set (see Table 3) in the case of the normal CP or a set or a set [16-27] (see Table 4) in the case of the extended CP is not configured.

The UE may assume that the CSI-RS antenna port of the CSI-RS resource configuration has a QCL relationship with respect to a delay spread, Doppler spread, a Doppler shift, an average gain, and an average delay.

The UE in which transmission mode 10 and QCL type B are configured may assume that antenna ports 0 to 3 corresponding to the CSI-RS resource configuration and antenna ports 15 to 22 corresponding to the CSI-RS resource configuration have the QCL relationship with respect to the Doppler spread, and the Doppler shift.

In the case of the UE in which transmission modes 1 to 9, one ZP CSI-RS resource configuration may be configured with respect to the serving cell in the UE. In the case of the UE in which transmission mode 10, one or more ZP CSI-RS resource configurations may be configured with respect to the serving cell in the UE.

The following parameters for the ZP CSI-RS resource configuration may be configured over the higher layer signaling.

ZP CSI-RS configuration (zeroTxPowerResourceConfig-List) (see Tables 3 and 4): Parameter for zero-power CSI-RS configuration ZP CSI-RS subframe configuration (eroTxPowerSubframeConfig, i.e., I_CSI-RS) (see Table 5): Parameter for subframe period and/or offset in which zero-power CSI-RS is to be transmitted The ZP CSI-RS and the PMCH are not configured together in the same subframe of the serving cell.

In the case of the UE in which transmission mode 10, one or more Channel-State Information-Interference Measurement (CSI-IM) resource configurations may be configured with respect to the serving cell.

The following parameters for each CSI-IM resource configuration may be configured over the higher layer signaling.

ZP CSI-RS configuration (see Tables 3 and 4)

ZP CSI-RS subframe configuration (I_CSI-RS) (see Table 5)

The CSI-IM resource configuration is the same as any one of the configured ZP-CSI-RS resource configurations.

The CSI-IM resource and the PMCH are not configured together in the same subframe of the serving cell.

Massive MIMO

A MIMO system having a plurality of antennas may be called a massive MIMO system and attracts attention as a means for improving spectral efficiency, energy efficiency and processing complexity.

Recently, the massive MIMO system has been discussed in order to meet requirements for spectral efficiency of future mobile communication systems in 3GPP. Massive MIMO is also called full-dimension MIMO (FD-MIMO).

LTE release-12 and following wireless communication systems consider introduction of an active antenna system (AAS).

Distinguished from conventional passive antenna systems in which an amplifier capable of adjusting the phase and magnitude of a signal is separated from an antenna, the AAS is configured in such a manner that each antenna includes an active element such as an amplifier.

The AAS does not require additional cables, connectors and hardware for connecting amplifiers and antennas and thus has high energy efficiency and low operation costs. Particularly, the AAS supports electronic beam control per antenna and thus can realize enhanced MIMO for forming accurate beam patterns in consideration of a beam direction and a beam width or 3D beam patterns.

With the introduction of enhanced antenna systems such as the AAS, massive MIMO having a plurality of input/output antennas and a multi-dimensional antenna structure is also considered. For example, when a 2D antenna array instead of a conventional linear antenna array is formed, a 3D beam pattern can be formed using active antennas of the AAS.

Figure 10:
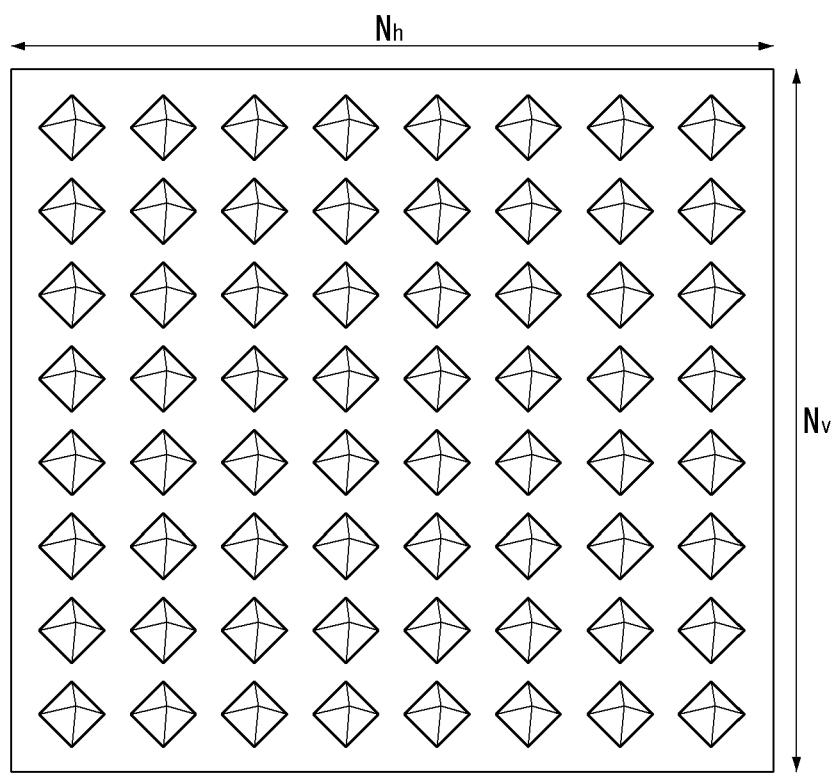
FIG. 10 illustrates a two-dimensional (2D) active antenna system having 64 antenna elements in a wireless communication system to which the present disclosure is applicable.

FIG. 10 illustrates a 2D AAS having 64 antenna elements in a wireless communication system to which the present disclosure is applicable.

FIG. 10 illustrates a normal 2D antenna array. A case in which Nt=Nv·Nh antennas are arranged in a square form, as shown in FIG. 10, may be considered. Here, Nh indicates the number of antenna columns in the horizontal direction and Nv indicates the number of antenna rows in the vertical direction.

When the aforementioned 2D antenna array is used, radio waves can be controlled in both the vertical direction (elevation) and the horizontal direction (azimuth) to control transmitted beams in a 3D space. A wavelength control mechanism of this type may be referred to as 3D beamforming.

Figure 11:
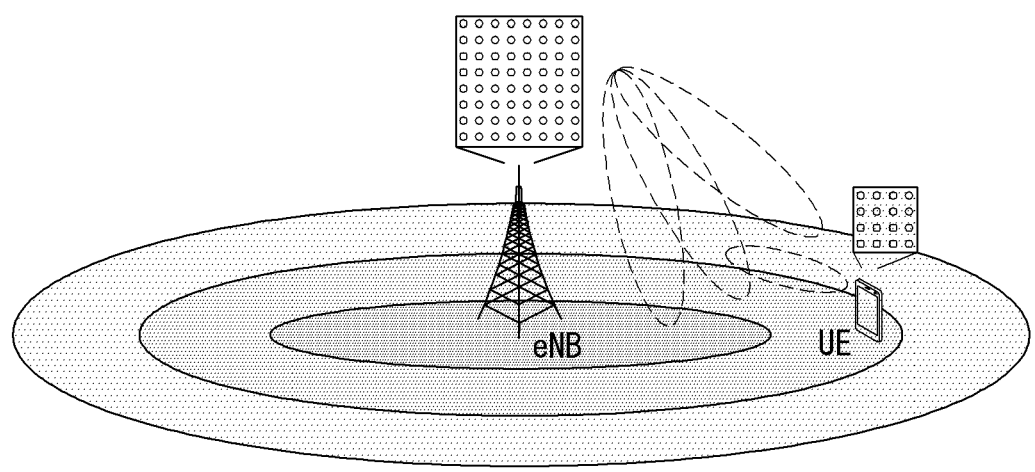
FIG. 11 illustrates a system in which a base station or a UE has a plurality of transmission/reception antennas capable of forming AAS based three-dimensional (3D) beams in a wireless communication system to which the present disclosure is applicable.

FIG. 11 illustrates a system in which an eNB or a UE has a plurality of transmission/reception antennas capable of forming AAS based 3D beams in a wireless communication system to which the present disclosure is applicable.

FIG. 11 schematizes the above-described example and illustrates a 3D MIMO system using a 2D antenna array (i.e., 2D-AAS).

From the viewpoint of transmission antennas, quasi-static or dynamic beam formation in the vertical direction as well as the horizontal direction of beams can be performed when a 3D beam pattern is used. For example, application such as sector formation in the vertical direction may be considered.

From the viewpoint of reception antennas, a signal power increase effect according to an antenna array gain can be expected when a received beam is formed using a massive reception antenna. Accordingly, in the case of uplink, an eNB can receive signals transmitted from a UE through a plurality of antennas, and the UE can set transmission power thereof to a very low level in consideration of the gain of the massive reception antenna.

Figure 12:
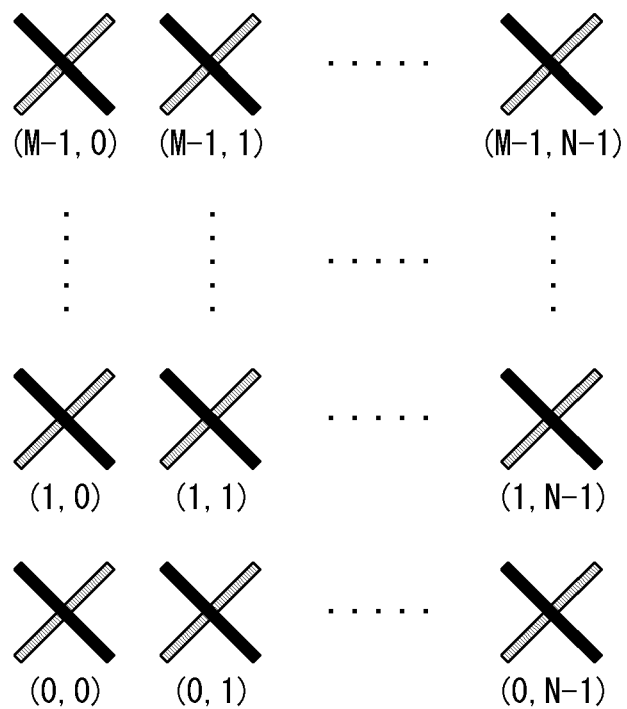
FIG. 12 illustrates a 2D antenna system having cross polarization in a wireless communication system to which the present disclosure is applicable.

FIG. 12 illustrates a 2D antenna system having cross polarization in a wireless communication system to which the present disclosure is applicable.

2D planar antenna array model considering polarization may be schematized as shown in FIG. 12.

Distinguished from conventional MIMO systems using passive antennas, systems based on active antennas can dynamically control gains of antenna elements by applying a weight to an active element (e.g., amplifier) attached to (or included in) each antenna element. Since a radiation pattern depends on antenna arrangement such as the number of antenna elements and antenna spacing, an antenna system can be modeled at an antenna element level.

The antenna arrangement model as shown in FIG. 12 may be represented by (M, N, P) which corresponds to parameters characterizing an antenna arrangement structure.

M indicates the number of antenna elements having the same polarization in each column (i.e., in the vertical direction) (i.e., the number of antenna elements having +45° slant in each column or the number of antenna elements having −45° slant in each column).

N indicates the number of columns in the horizontal direction (i.e., the number of antenna elements in the horizontal direction).

P indicates the number of dimensions of polarization. P=2 in the case of cross polarization as shown in FIG. 12, whereas P=1 in the case of co-polarization.

An antenna port may be mapped to a physical antenna element. The antenna port may be defined by a reference signal associated therewith. For example, antenna port 0 may be associated with a cell-specific reference signal (CRS) and antenna port 6 may be associated with a positioning reference signal (PRS) in the LTE system.

For example, antenna ports and physical antenna elements may be one-to-one mapped. This may correspond to a case in which a single cross-polarization antenna element is used for downlink MIMO or downlink transmit diversity. For example, antenna port 0 may be mapped to a single physical antenna element, whereas antenna port 1 may be mapped to another physical antenna element. In this case, two downlink transmissions are present in terms of a UE. One is associated with a reference signal for antenna port 0 and the other is associated with a reference signal for antenna port 1.

Alternatively, a single antenna port may be mapped to multiple physical antenna elements. This may correspond to a case in which a single antenna port is used for beamforming. Beamforming can cause downlink transmission to be directed to a specific UE by using multiple physical antenna elements. This can be accomplished using an antenna array composed of multiple columns of multiple cross-polarization antenna elements in general. In this case, a single downlink transmission derived from a single antenna port is present in terms of a UE. One is associated with a CRS for antenna port 0 and the other is associated with a CRS for antenna port 1.

That is, an antenna port represents downlink transmission in terms of a UE rather than substantial downlink transmission from a physical antenna element in an eNB.

Alternatively, a plurality of antenna ports may be used for downlink transmission and each antenna port may be multiple physical antenna ports. This may correspond to a case in which antenna arrangement is used for downlink MIMO or downlink diversity. For example, antenna port 0 may be mapped to multiple physical antenna ports and antenna port 1 may be mapped to multiple physical antenna ports. In this case, two downlink transmissions are present in terms of a UE. One is associated with a reference signal for antenna port 0 and the other is associated with a reference signal for antenna port 1.

In FD-MIMO, MIMO precoding of a data stream may be subjected to antenna port virtualization, transceiver unit (TXRU) virtualization and an antenna element pattern.

In antenna port virtualization, a stream on an antenna port is precoded on TXRU. In TXRU virtualization, a TXRU signal is precoded on an antenna element. In the antenna element pattern, a signal radiated from an antenna element may have a directional gain pattern.

In conventional transceiver modeling, static one-to-on mapping between an antenna port and TXRU is assumed and TXRU virtualization effect is integrated into a (TXRU) antenna pattern including both the effects of the TXRU virtualization and antenna element pattern.

Antenna port virtualization may be performed through a frequency-selective method. In LTE, an antenna port is defined along with a reference signal (or pilot). For example, for transmission of data precoded on an antenna port, a DMRS is transmitted in the same bandwidth as that for a data signal and both the DMRS and the data signal are precoded through the same precoder (or the same TXRU virtualization precoding). For CSI measurement, a CSI-RS is transmitted through multiple antenna ports. In CSI-RS transmission, a precoder which characterizes mapping between a CSI-RS port and TXRU may be designed as an eigen matrix such that a UE can estimate a TXRU virtualization precoding matrix for a data precoding vector.

1D TXRU virtualization and 2D TXRU virtualization are discussed as TXRU virtualization methods, which will be described below with reference to the drawings.

Figure 13A:
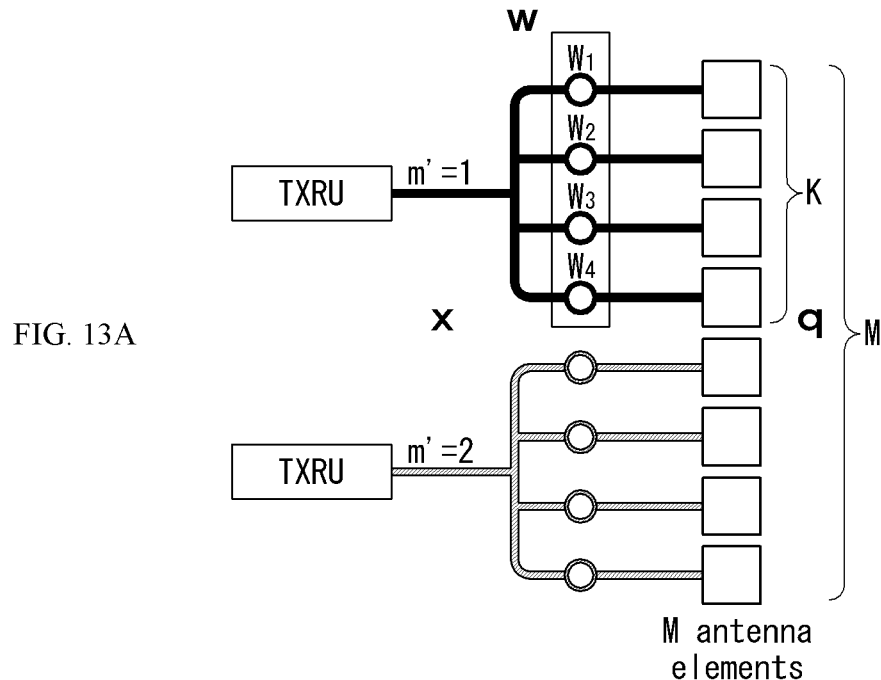
FIGS. 13A and 13B illustrate transceiver unit models in a wireless communication system to which the present disclosure is applicable.
Figure 13B:
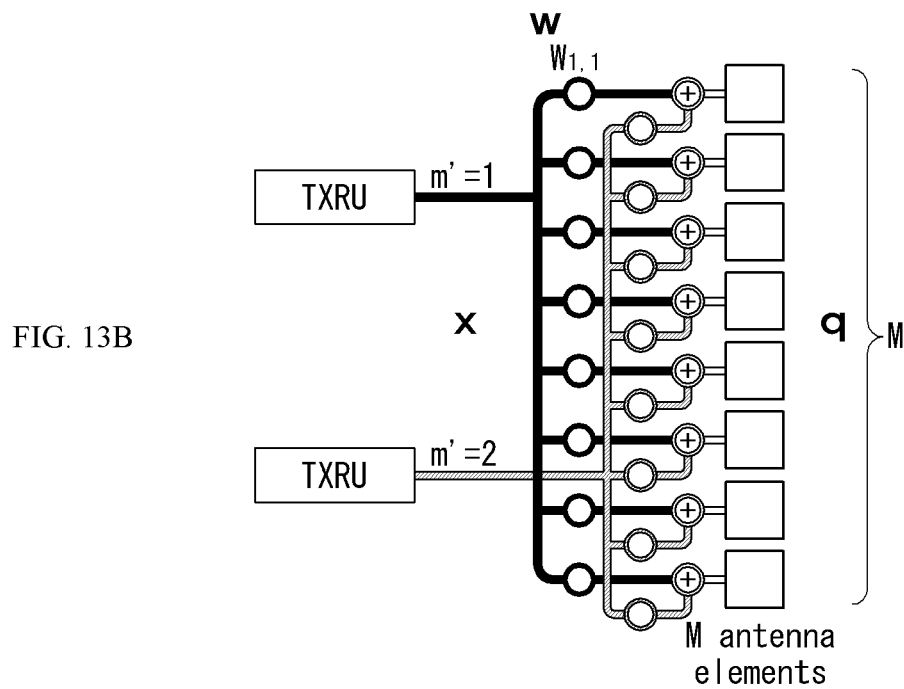

FIGS. 13A and 13B illustrate transceiver unit models in a wireless communication system to which the present disclosure is applicable.

In 1D TXRU virtualization, M_TXRU TXRUs are associated with M antenna elements in a single-column antenna arrangement having the same polarization.

In 2D TXRU virtualization, a TXRU model corresponding to the antenna arrangement model (M, N, P) of FIG. 12 may be represented by (M_TXRU, N, P). Here, M_TXRU denotes the number of 2D TXRUs present in the same column and the same polarization, and M_TXRU≤M all the time. That is, a total number of TXRUs is M_TXRU×N×P.

TXRU virtualization models may be divided into TXRU virtualization model option-1: sub-array partition model as shown in FIG. 13A and TXRU virtualization model option-2: full-connection model as shown in FIG. 13B according to correlation between antenna elements and TXRU.

Referring to FIG. 13A, antenna elements are partitioned into multiple antenna element groups and each TXRU is connected to one of the groups in the case of the sub-array partition model.

Referring to FIG. 13B, multiple TXRU signals are combined and delivered to a single antenna element (or antenna element array) in the case of the full-connection model.

In FIGS. 13A and 13B, q is a transmission signal vector of M co-polarized antenna elements in a single column, w is a wideband TXRU virtualization weight vector, W is a wideband TXRU virtualization weight matrix, and x is a signal vector of M_TXRU TXRUs.

Here, mapping between antenna ports and TXRUs may be 1-to-1 or 1-to-many mapping.

FIGS. 13A and 13B show an example of TXRU-to-antenna element mapping and the present disclosure is not limited thereto. The present disclosure may be equally applied to mapping between TXRUs and antenna elements realized in various manners in terms of hardware.

OFDM Numerology

As more and more communication devices require larger communication capacity, there is a need for improved mobile broadband communication compared to the existing radio access technology (RAT). Further, massive machine type communications (MTCs), which provide various services anytime and anywhere by connecting many devices and objects, are also one of the major issues to be considered in the next generation communication. In addition, in next-generation communication, a communication system design considering a service/UE sensitive to reliability and latency is being discussed. The introduction of next generation radio access technology considering enhanced mobile broadband communication, massive MTC, ultra-reliable and low latency communication (URLLC) is discussed, and in the present disclosure, the technology is called new RAT.

Hereinafter, in this specification, the technology may be referred to as a radio access network (RAN) to which NR is applied and may be referred to as an NG-RAN (New Generation-RAN) or a gNB, and may be collectively referred to as a base station.

Self-Contained Subframe Structure

Figure 14:
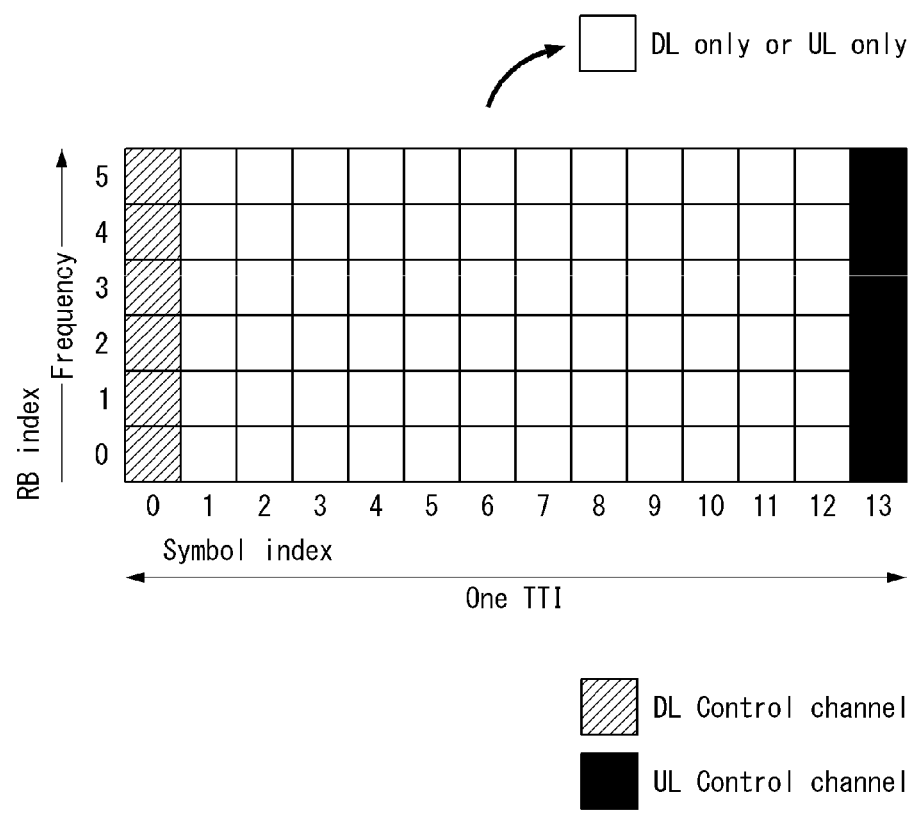
FIG. 14 is a diagram illustrating a self-contained subframe structure in the wireless communication system to which the present disclosure may be applied.

In order to minimize the latency of data transmission in a TDD system, the fifth generation new RAT considers a self-contained subframe structure in which a control channel and a data channel are time division multiplexed (TDMed) as illustrated in FIG. 14.

FIG. 14 is a diagram illustrating a self-contained subframe structure in the wireless communication system to which the present disclosure may be applied.

In FIG. 14, a hatched area indicates a transmission area of a physical channel (e.g., PDCCH) for DCI delivery and a black part indicates a transmission area of the physical channel (e.g., PUCCH) for Uplink Control Information (UCI) delivery.

The control information delivered by the eNB to the UE via the DCI may include information on the cell configuration which the UE should know, DL specific information such as DL scheduling, and/or UL specific information such as a UL grant. Further, the control information by the UE to the eNB via the UCI may include an ACK/NACK report for HARQ for DL data, CSI report for a DL channel state, and/or a scheduling request (SR).

In FIG. 14, an unmark area may be used a physical channel (e.g., PDSCH) transmission area for downlink data and or used as a physical (e.g., PUSCH) transmission area for uplink data. Such a structure is characterized in that DL transmission and UL transmission are sequentially performed in one subframe (SF), and DL data is transmitted in the corresponding SF, and UL ACK/NACK may be received. As a result, according to such a structure, it takes less time to retransmit data when a data transmission error occurs, thereby minimizing the latency of final data delivery.

In such a self-contained subframe structure, there is a need for a time gap between the eNB and the UE for the conversion process from the transmission mode to the reception mode or from the reception mode to the transmission mode. To this end, some OFDM symbols at the time of switching from DL to UL in the subframe structure may be configured to a guard period (GP) and such a subframe type may be referred to as a 'self-contained SF'.

Analog Beamforming

In the millimeter wave (mmW), the wavelength is shortened, so that a plurality of antenna elements may be installed in the same area. That is, a total of 64 antenna elements can be installed in a 2-dimensional array at a 0.5 lambda (i.e., wavelength) interval on a panel of 5×5 cm (alternatively, 5 by 5 cm) with a wavelength of 1 cm in a 30 GHz band. Therefore, in the mmW, it is possible to increase a beamforming (BF) gain to increase coverage or increase throughput by using multiple antenna elements.

In this case, if a transceiver unit (TXRU) is provided so that transmission power and phase may be adjusted for each antenna element, independent beamforming is possible for each frequency resource. However, when the TXRUs are installed on all 100 antenna elements, there is a problem in that effectiveness is deteriorated in terms of costs. Therefore, a method of mapping a plurality of antenna elements to one TXRU and adjusting a direction of a beam using an analog phase shifter is considered. Such an analog beamforming method has a disadvantage in that frequency selective beamforming cannot be performed by making only one beam direction in all bands.

A hybrid BF with B TXRUs, which is an intermediate form of digital BF and analog BF, and fewer than Q antenna elements, can be considered. In this case, although there is a difference depending on a connection method of B TXRUs and Q antenna elements, the number of directions of the beams that can be transmitted at the same time is limited to B or less.

Further, in a New RAT system, when multiple antennas are used, a hybrid beam forming technique combining digital beam forming and analog beam forming is emerging. In this case, the analog beamforming (or radio frequency (RF) beamforming) means an operation of performing precoding (or combining) in an RF stage. In the hybrid beamforming, each of a baseband stage and the RF stage perform precoding (or combining), thereby reducing the number of RF chains and the number of digital (D)/analog (A) converters and achieving performance close to the digital beamforming. For convenience, the hybrid beamforming structure may be represented by N transceiver units (TXRU) and M physical antennas. Then, the digital beamforming for L data layers to be transmitted by the transmitter may be represented by an N by L matrix, and then the N digital signals converted are converted into an analog signal via the TXRU and then applied the analog beamforming represented by an M by N matrix.

Figure 15:
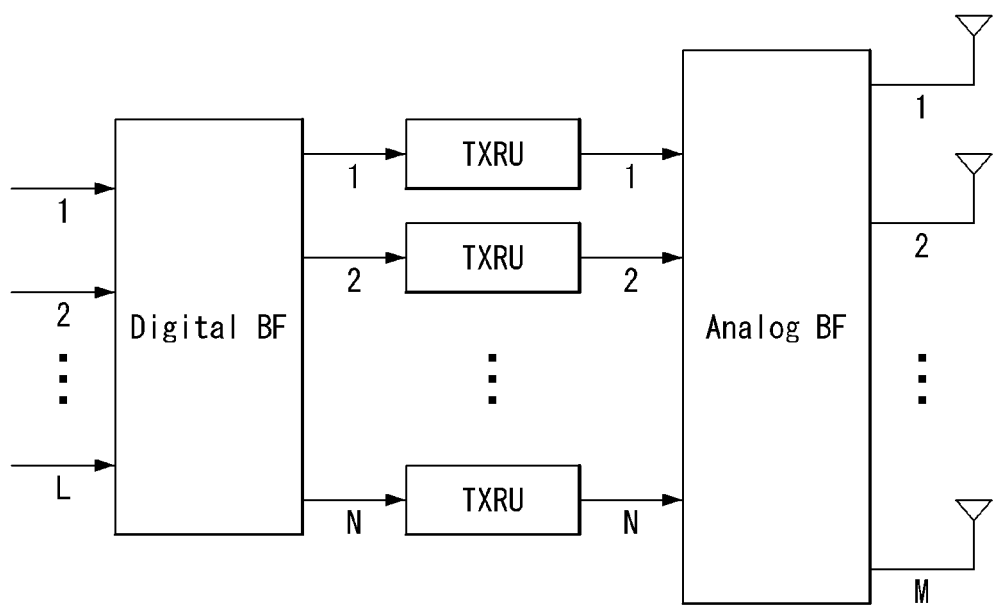
FIG. 15 is a diagram illustrating a hybrid beamforming structure in terms of TXRU and a physical antenna in a wireless communication system to which the present specification may be applied.

FIG. 15 is a diagram illustrating a hybrid beamforming structure in terms of TXRU and a physical antenna in a wireless communication system to which the present specification may be applied.

In FIG. 15, a case where the number of digital beams is L and the number of analog beams is N is illustrated.

In the New RAT system, considered is a direction in which it is designed so that the BS may change the analog beamforming by the unit of the symbol to support more efficient beamforming to a UE positioned in a specific region. Furthermore, in FIG. 15, when N specific TXRUs and M specific RF antennas are defined as one antenna panel, a scheme that introduces a plurality of antenna panels capable of independent hybrid beamforming is also considered in the New RAT system.

When the eNB uses a plurality of analog beams, analog signals favorable for signal reception may different each UE, and as a result, a beam sweeping operation is considered, which allows all UEs to have a reception opportunity by changing a plurality of analog beams which the ENB is to apply for each symbol in a specific subframe (SF) at least with respect to a synchronization signal, system information, paging, etc.

Figure 16:
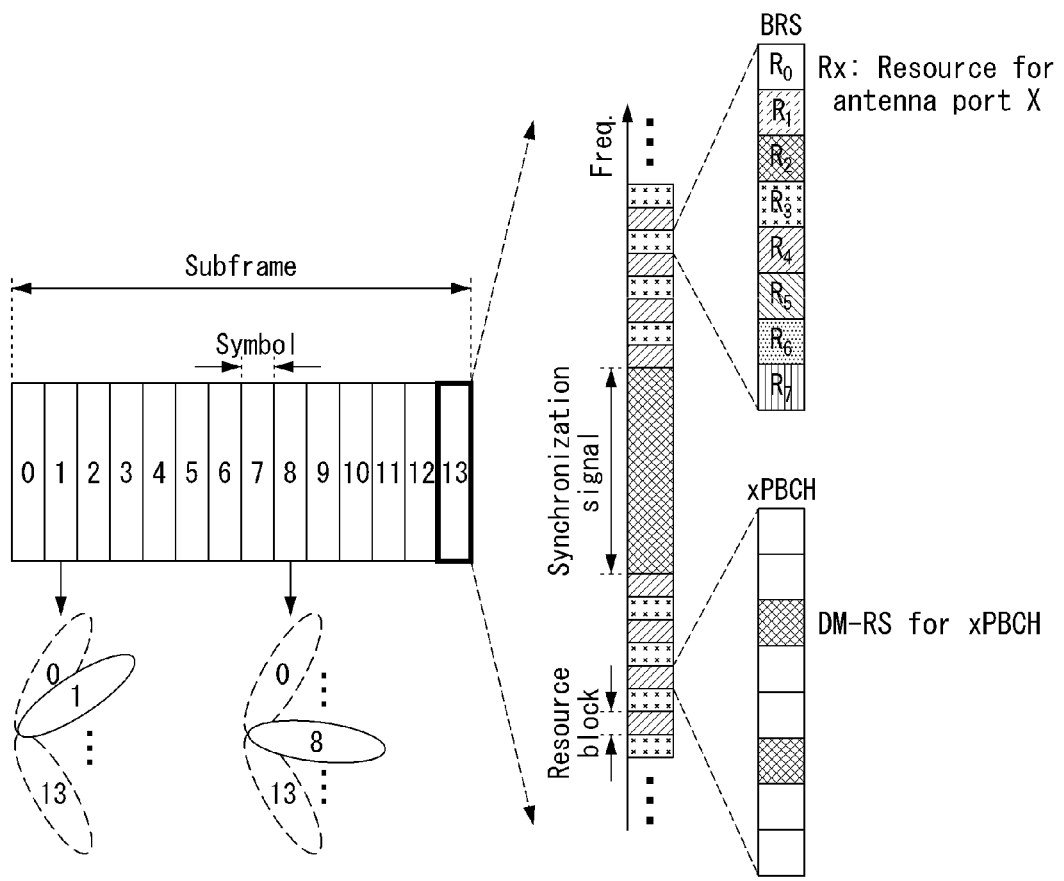
FIG. 16 is a schematic diagram of a beam sweeping operation for a synchronization signal and system information in a downlink transmission process in a wireless communication system to which the present disclosure may be applied.

FIG. 16 is a schematic diagram of a beam sweeping operation for a synchronization signal and system information in a downlink transmission process in a wireless communication system to which the present disclosure may be applied.

In FIG. 16, a physical resource (or physical channel) through which the system information is transmitted in a broadcasting scheme in the New RAT is referred to as physical broadcast channel (xPBCH).

Referring to FIG. 16, analog beams which belong to different antenna panels may be simultaneously transmitted in one symbol. In order to measure the channel for each analog beam, a method is discussed, which introduces a beam RS (BRS) which is a reference signal (RS) in which a single analog beam (corresponding to a specific antenna panel) is applied and transmitted as illustrated in FIG. 16. The BRS may be defined for a plurality of antenna ports and each antenna port of the BRS may correspond to the single analog beam. In this case, unlike the BRS, the synchronization signal or xPBCH may be transmitted, to which all of the analog beams in the analog beam group are applied so as to be well received by random UEs.

Radio Resource Management (RRM) Measurement

The LTE system supports RRM operations for power control, scheduling, cell search, cell reselection, handover, radio link or connection monitoring, connection establishment/re-establishment, etc. The serving cell may request RRM measurement information, which is a measurement value for performing the RRM operations, to the UE. Representatively, in the LTE system, the UE may measure/acquire information including cell search information for each cell, reference signal received power (RSRP), reference signal received quality (RSRQ), and the like and report the measured information to the eNB. Specifically, in the LTE system, the UE receives a measurement configuration ('measConfig') as a higher layer signal for RRM measurement from the serving cell. The UE may measure RSRP or RSRQ according to information of the 'measConfig'. Here, the definition of the RSRP, the RSRQ, and the received signal strength indicator (RSSI) according to TS 36.214 document of the LTE system is as follows.

1) RSRP

The reference signal received power (RSRP) is defined as a linear average in power contributions ([W]) of a resource element delivering a cell-specific RS (CRS) within a considered measurement frequency bandwidth. For RSRP determination the cell-specific reference signals R0 according TS 36.211 [3] shall be used. When the UE may reliably detect that R1 is available, the UE may determine the RSRP by using R1 in addition to R0.

The reference point for the RSRP shall be the antenna connector of the UE.

When receiver diversity is used by the UE, a reported value need not be smaller than the RSRP corresponding to a random individual diversity branch.

2) RSRQ

The reference signal received quality (RSRQ) is defined as a ratio N×RSRP/(E-UTRA carrier RSSI) (i.e., E-UTRA carrier RSSI to N×RSRP) and N represents the number of RBs of an E-UTRA carrier RSSI measurement bandwidth. The measurements in the numerator and denominator shall be made over the same set of resource blocks.

An E-UTRA Carrier Received Signal Strength Indicator (RSSI) may include the linear average of the total received power (in [W]) observed/measured by the UE only in OFDM symbols containing reference symbols for antenna port 0, in the measurement bandwidth, over N number of resource blocks from all sources, including co-channel serving and non-serving cells, channel interference, thermal noise etc. When the higher layer signaling represents a specific subframe for performing the RSRQ measurement, the RSSI may be measured for all OFDM symbols in the indicated subframe.

The reference point for the RSRP shall be the antenna connector of the UE.

When receiver diversity is used by the UE, a reported value need not be smaller than the RSRQ corresponding to a random individual diversity branch.

3) RSSI

The RSSI may correspond to received broadband power including thermal noise and noise generated at the receiver within a bandwidth defined by a receiver pulse shaping filter.

The reference point for measuring the RSSI should be the antenna connector of the UE.

When receiver diversity is used by the UE, a reported value need not be smaller than the UTRA carrier RSSI corresponding to a random individual receiving antenna branch.

According to such a definition, the UE which operates in the LTE system may be allowed to measure the RSRP in a bandwidth corresponding to one of 6, 15, 25, 50, 75, and 100 resource blocks (RB s) through an information element (IE) related with an allowed measurement bandwidth transmitted system information block type 3 (SIB3) in the case of intra-frequency measurement and through an allowed measurement bandwidth transmitted in system information block type 5 (SIB5) in the case of inter-frequency measurement. Alternatively, in the absence of such an IE, the UE may perform measurement in a frequency band of the entire downlink (DL) system by default. In this case, when the UE receives an allowed measurement bandwidth, the UE may consider the corresponding value as a maximum measurement bandwidth and arbitrarily measure the value of the RSRP within the corresponding bandwidth/value. However, when the serving cell transmits an IE defined as WB-RSRQ and the allowed measurement bandwidth is set to 50 RB or more, the UE needs to calculate the RSRP value for the entire allowed measurement bandwidth. Meanwhile, the RSSI may be measured in the frequency band of the receiver of the UE according to the definition of the RSSI bandwidth.

Figure 17:
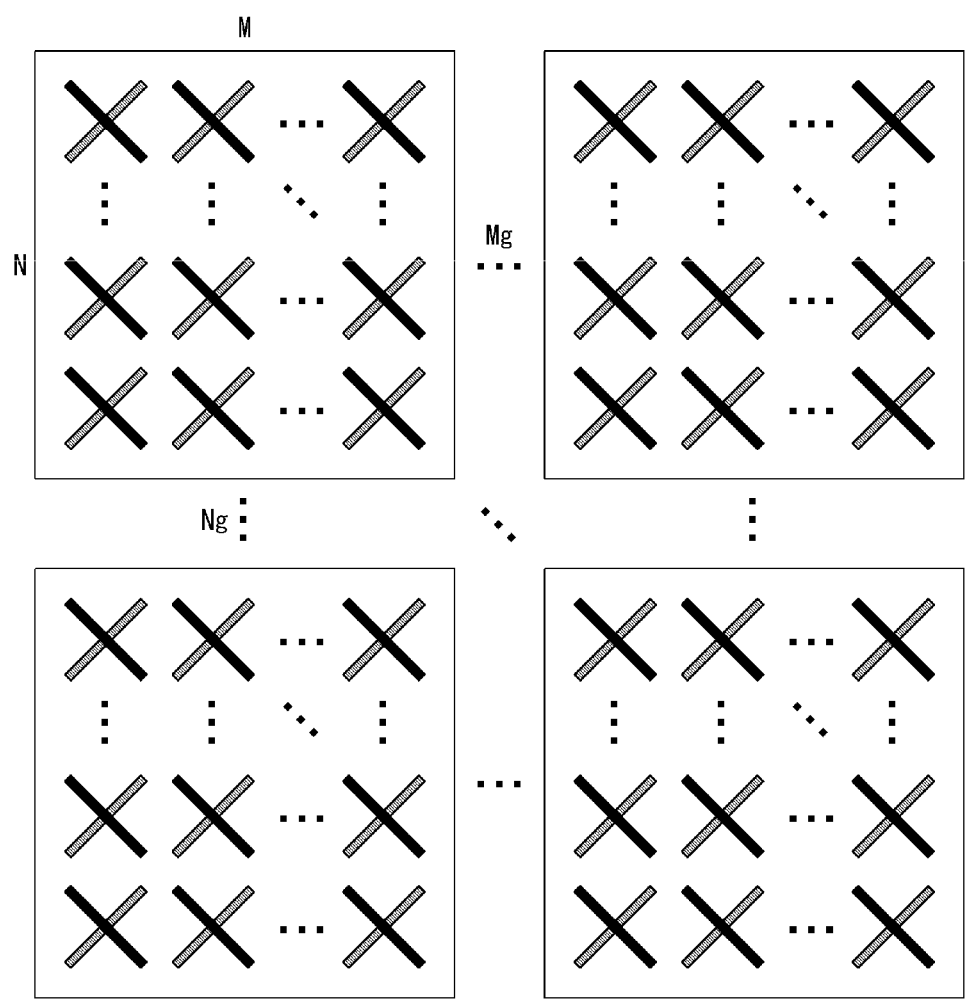
FIG. 17 illustrates a panel antenna array to which the present disclosure may be applied.

FIG. 17 illustrates a panel antenna array to which the present disclosure may be applied.

Referring to FIG. 17, each panel antenna array may be constituted by Mg panels as a horizontal domain and Ng panels as a vertical domain and each one panel may be constituted by M columns and N rows. In particular, in this figure, the panel is illustrated based on a cross polarization (X-pol) antenna. Accordingly, the total number of antenna elements in FIG. 17 may be 2*M*N*Mg*Ng.

Method for designing high resolution codebook

Technical Specification (TS) 38.802 will be described below with respect to Type II Channel State Information (CSI) category I.

Dual stage W=W1·W2 codebook

W1 includes a set of L orthogonal beams obtained from 2D Discrete Fourier Transform (DFT) beams. The set of L beams is selected from a basis constituted by oversampled 2D DFT beams. L∈{2, 3, 4, 6} (L may be configured) and beam selection for a? wideband is performed.

W2: L beams are combined in W2 having common W1. A beam combination coefficient is reported to a subband of phase quantization. Any one of Quadrature Phase Shift Keying (QPSK) and 8-phase shift keying (PSK) related information quantization may be selected.

A Technical Report (TR) is described below with respect to Type II CSI category II.

Feedback of a channel covariance matrix is performed with respect to a long term and a wideband. A quantized/compressed version of a covariance matrix is reported by the UE. Quantization/compression is based on M orthogonal basis vectors. The report may include a set of coefficients and an indicator of M basis vectors.

For W1:

With respect to the orthogonal basis, a group of up to eight uniformly spaced orthogonal beams is selected, and two beams are selected from the group. A non-equal gain combination (2 bits) is performed with respect to the wideband. Two beams are selected with respect to the wideband.

For W2:

The beams are combined in W2 using QPSK. Independent encoding between layers is applied.

W1 and W2 are expressed by Equation 15 below.

$$W_1 = \begin{bmatrix} B & 0 \\ 0 & B \end{bmatrix},$$ [Equation 15]

$$B = \begin{bmatrix} p_0 b_{k_1}(0)_{,k_2}(0), \ldots, p_{L-1} b_{k_1}(L-1)_{,k_2}(L-1) \end{bmatrix}$$

$$\text{For rank 1:} W = \begin{bmatrix} \tilde{w}_{0,0} \\ \tilde{w}_{1,1} \end{bmatrix} = W_1 W_2, \text{ and } W_2 = \begin{bmatrix} c_{0,0} \\ c_{1,0} \end{bmatrix}$$

$$\text{For rank 2:} W = \begin{bmatrix} \tilde{w}_{0,0} & \tilde{w}_{0,1} \\ \tilde{w}_{1,0} & \tilde{w}_{1,1} \end{bmatrix} = W_1 W_2,$$

$$\text{and } W_2 = \begin{bmatrix} c_{0,0} & c_{0,1} \\ c_{1,0} & c_{1,1} \end{bmatrix}$$

$$c_{r,l} = [c_{r,l,0}, \ldots, c_{r,l,L-1}]^T, r = 0, 1, l = 0, 1$$

$$\tilde{w}_{r,l} = \sum_{i=0}^{L-1} b_{k_1}(i)_{k_2} \cdot p_i \cdot c_{r,l,i}; r = 0, 1, l = 0, 1$$

In Equation 15, L (=2) represents the number of beams. Represents a 2D DFT beam from an oversampled grid (here, $k_1=0,1, \ldots N_1O_1-1, k_2=0,1, \ldots N_2O_2-1$). $N_1$ and $N_2$ represent the numbers of antenna ports in a first dimension and a second dimension, respectively. $O_1$ and $O_2$ represent oversampling factors in the first dimension and the second dimension, respectively. $p_i$ ($0 \leq p_i \leq 1$) represents a beam power adjusting/scaling factor for beam i. $c_{r,l,i}$ represents a beam combining coefficient on beam I, polarization r, and layer r.

i) W beam selection $O_1=O_2=4$ (if $N_2=1$, $O_2=1$)

$2N_1N_2 \in \{4,8,12,16,20,24,28,32\}$

Leading (stronger) beam index: $k_1\hat{\ }(0)=0,1,\ldots,N_1O_1-1$; $k_2\hat{\ }(0)=0,1,\ldots,N_2O_2-1$ Second (weaker) beam index: $k_1\hat{\ }(1)=k_1\hat{\ }(0)+O_1d_1$; $k_2\hat{\ }(1)=k_2\hat{\ }(0)+O_2d_2$; $d_1 \in \{0,\ldots,\min(N_1,L_1)-1\}$, $d_2 \in \{0,\ldots,\min(N_2,L_2)-1\}$; $(d_1,d_2) \neq (0,0)$; Here, $L_1$ and $L_2$ are defined as follows.

If $N_1 \geq N_2$ and $N_2 \neq 1$, $L_1=4$ and $L_2=2$; if $N_1<N_2$ and $N_1 \neq 1$, $L_2=4$ and $L_1=2$; and if $N_2=1$, $L_1=8$ and $L_2=1$.

ii) W1 beam power

Second beam power is quantized with 2 bits.

$p_0=1$, $p_1 \in \{1, \sqrt{0.5}, \sqrt{0.25}, 0\}$ iii) W2

Continuously, $c_{0,0,0}=c_{0,1,0}=1$ $C_{r,1,i} \in \{1, j, -1, -j\}$, $\forall i,r,1$ iv) Codebook payload When $N_1=N_2=4$, W1 overhead is as follows and when one subband is summarized, one subbband is described below Table 6.

Overhead for indicating leading beam: $\lceil \log_2 N_1N_2O_1O_2 \rceil = \lceil \log_2 16N_1N_2 \rceil = 8$ bits Overhead for indicating second beam:

$$\left\lceil \binom{7}{1} \right\rceil = 3 \text{ bits}$$

Relative power of weaker beam: 2 bits

Table 6 shows W1 and W2 overhead for each rank with respect to one subband in the case of $N_1=N_2=4$.

TABLE 6

| Rank | W1 (bits) | W2 (bits) |
|---|---|---|
| 1 | 13 | 6 |
| 2 | 13 | 12 |

Referring to Table 6, W1 needs 13 bits irrespective of a rank as described above, and W2 needs 6 bits (i.e., $c_{0,0,0}=1$, so no bits are needed, every 2 bits for each of $c_{1,0,0}$, $c_{0,0,1}$, and $c_{1,0,1}$) or 12 bits (i.e., $c_{0,0,0}=c_{0,1,0}=1$, so no bits are needed, c1,0,0, 2 bits for each of $c_{1,0,0}$, $c_{0,0,1}$, $c_{1,0,1}$, $c_{1,1,0}$, $c_{0,1,1}$, and $c_{1,1,1}$) according to the rank. This is because, in the case of W1, a power coefficient is commonly applied regardless of the layer, and in the case of W2, a co-phase is independently applied to each layer. In particular, in the case of W2, the phase component of i22 and the co-phase component of i23 may be combined and represented as one co-phase component.

In an environment such as New Radio Access Technology (NR), high resolution feedback is considered, such as linear combination (LC) and covariance feedback for more accurate CSI feedback.

In the case of an implicit based LC codebook, in order to maximize its performance, it is also considered to combine (i.e., amplitude and/or phase) beams in terms of subbands (SBs). In this case, even if there are two beams to be combined, at least 6 bits (rank 1) are required depending on the resolution of the coupling coefficients. Accordingly, the reported total feedback size increases linearly according to the number of beams to be combined, the granularity of the combined coefficients, the SB size, and the like, which cause a large burden in designing a feedback chain. The present disclosure proposes a codebook design method for reducing feedback overhead of SB reporting.

As illustrated above in FIG. 17, NR supports multi-panel functionality, but in the present disclosure, the present disclosure is described by assuming a single panel for convenience of description. However, this is for convenience of description and the present disclosure may be applied in the same scheme even to multiple panels.

Hereinafter, in the description of the present disclosure, in the 2D antenna array for convenience of description, the first dimension/domain is mainly referred to as a horizontal dimension/domain, and the second dimension/domain is mainly referred to as a vertical dimension/domain, but the present disclosure is not limited thereto.

Further, hereinafter, in describing the present disclosure, unless otherwise described, the same variables used in respective equations may be represented by the same symbol and may be interpreted identically.

Further, hereinafter, in describing the present disclosure, the beam may be interpreted as a precoding matrix (alternatively, a precoding vector or codeword) for generating the corresponding beam and the beam group may be interpreted as the same meaning as the set (alternatively, a set of precoding vectors) of the precoding matrixes.

First, the 2D DFT beam to be applied to the 2D antenna array in one panel is defined as in Equation 16 below. Here, m_1 and m_2 denote indexes of 1D-DFT codebooks of the first domain and the second domain, respectively.

$$w_{m_1,m_2} = \frac{v_{m_1} \otimes u_{m_2}}{\sqrt{N_1N_2}} \quad \text{[Equation 16]}$$

In Equation 16, N_1 and N_2 represent the numbers of antenna ports for each polarization (pol) in the first domain and the second domain in the panel, respectively. o_1 and o_2 represent oversampling factors in the first domain and the second domain in the panel, respectively. In addition, $$v_{m_1} = \left[1 \; \exp\left(j\frac{2\pi m_1}{o_1 N_1}\right) \ldots \exp\left(j\frac{2\pi m_1(N_1-1)}{o_1 N_1}\right)\right]^T \text{ and}$$

$$u_{m_2} = \left[1 \; \exp\left(j\frac{2\pi m_2}{o_2 N_2}\right) \ldots \exp\left(j\frac{2\pi m_2(N_2-1)}{o_2 N_2}\right)\right]^T.$$

In the case of Equation 16, port indexing is first performed with respect to the N_2 domain, but the present disclosure is not limited thereto, and the present disclosure may be obviously extended even when the port indexing is first performed with respect to the N_1 domain.

Frequency selectivity of the frequency axis is associated with a multi-path channel response. In general, when the delay caused by multiple paths is large, a probability that the frequency selectivity will occur increases.

The delay on the time axis may be interpreted as a phase change on the frequency axis and the phase change on the frequency axis may be expressed as a function of the frequency. For example, the phase change on the frequency axis may be expressed as exp(−j2πkδ). Here, k represents an index (e.g., a subcarrier index or a subband index) corresponding to the frequency and a delta (δ) may be interpreted as a coefficient representing a degree of a frequency phase change.

In the present disclosure, by using the principle described above, at the time of configuring a linear combining codebook, the UE additionally reports a phase change value (δ) for each of beams which are linearly combined in terms of the wideband (and/or long term) to compensate beam combination in terms of the SB in a form of a product (δ) of the function of the frequency and the phase change value described above. As a result, according to the embodiment of the present disclosure, there is an effect that feedback bits may be significantly reduced due to (phase and/or amplitude) linear combination per subband.

First, a method of configuring an LC codebook will be described.

In the dual codebook structure, W1 may be configured as follows.

W1 may be defined as shown in Equation 17 below.

$$w_1 = \begin{bmatrix} B_1 & 0 \\ 0 & B_2 \end{bmatrix}$$ [Equation 17]

As shown in Equation 17, W1 has a form of a convex diagonal matrix and here, $B_i=[b_{i,1}, b_{i,2}, \ldots, b_{i,L}](\in C^{N_1 N_2 \times L})$. $b_{i,1}(1=1, \ldots, L)$ corresponds to the 2D/1D DFT beam defined by Equation 16 above.

Here, L represents the number of beams that are linearly combined and this value may be expressed, for example, as L=2, 3, 4, or the like. The L value may be previously promised between the eNB and the UE, or the eNB may inform the UE of the L value by higher layer signaling (e.g., RRC or MAC Control Element (CE)). Alternatively, the UE may feed back information on the L value to the eNB.

Figure 18:
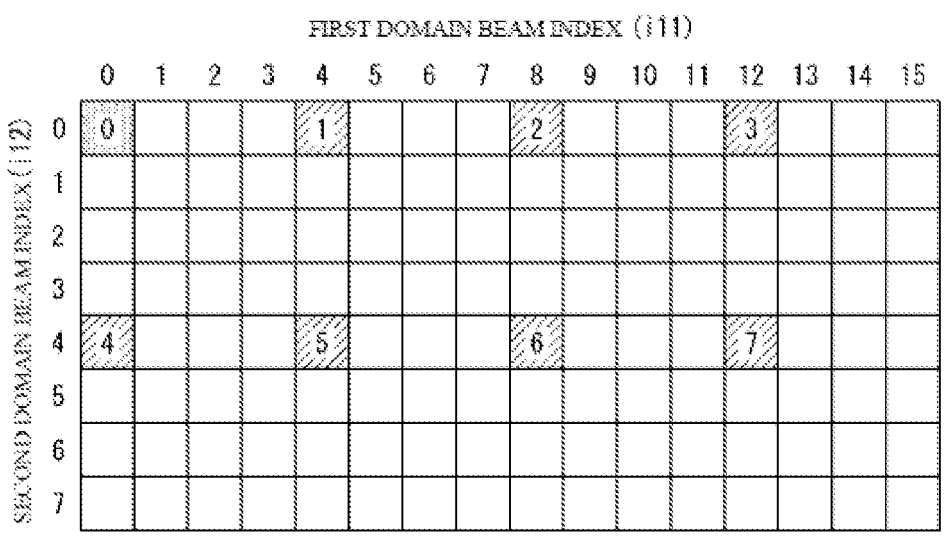
FIG. 18 is a diagram illustrating a set of orthogonal beams according to an embodiment of the present disclosure.

FIG. 18 is a diagram illustrating a set of orthogonal beams according to an embodiment of the present disclosure.

FIG. 18 illustrates a set of orthogonal beams for N_1=4 and N_2=2 in a leading beam index (i_11=0 and i_12=0).

In W1, beams constituting each block diagonal matrix $B_i$ may be calculated from the orthogonal basis as illustrated in FIG. 18. In other words, L beams may be selected from N_1·N_2 orthogonal basis sets constituted by (N1·N2−1) beams orthogonal to a given leading beam index (e.g., corresponds to i_11 and i_12 of the LTE codebook) or subsets thereof.

In the present disclosure, for convenience of description, a case of $B_1=B_2=B$ is first described.

The elements constituting W1 may be constituted by leading beam selection, combining beam selection (e.g., L−1 beam selection from N_1·N_2 beams), a power coefficient indicator, and a phase change value δ for each beam described above. Then, elements of $B=[b_1, b_2, \ldots, b_L]$ $(\in C^{N_1 N_2 \times L})$ constituting B may be configured as shown in Equation 18 below.

$$B=[b_1 e^{-j2\pi k\delta_1+\epsilon_1}, p_2 b_2 e^{-j2\pi k\delta_2+\epsilon_2}, \ldots, p_L b_L e^{-j2\pi k\delta_L+\epsilon_L}]$$
$$(\in C^{N_1 N_2 \times L})$$ [Equation 18]

In Equation 18, $b_1$ represents the leading beam and $b_l$ (l=2, ..., L) represents beams (this may be referred to as a combining beam) combined with the leading beam. $p_l$ represents a relative beam power based on (compared with) a power of the leading beam and this is previously promised between the UE and the eNB with a value such as $p_l=\{\sqrt{0.5}, \sqrt{0.25}, 0\}$ or the eNB may inform the UE of granularity of power set value through the higher layer signaling (e.g., RRC or MAC CE). Alternatively, the UE may feed back information on the granularity of the power set value to the eNB. Here, power information may vary depending on layer/polarization.

In Equation 18 above, variables of the phase change value may be defined as shown in Equation 19 below.

$$\delta_l = \frac{\lambda_l}{\upsilon\eta}$$ [Equation 19]

In Equation 19, variables constituting $\delta_l$ may be defined as follows.

The eNB may inform the UE of a η value through the higher layer signaling (e.g., RRC or MAC CE) or a previously promised value may be used according to numerology. Alternatively, a η value may be set to a smallest value satisfying $\eta \geq N_{cRB}^{DL} N_{sc}^{cRB}$ in {128,256,512,1024,2048, 4096}. Here, $N_{cRB}^{DL}$, $N_{sc}^{cRB}$ represent the number of resource blocks (RBs) configured for the CSI reporting and the number of subcarriers per configured RB, respectively and eventually, $N_{cRB}^{DL} N_{sc}^{cRB}$ represents the number of subcarriers in a bandwidth (BW) configured for the CSI reporting.

Alternatively, the eNB may configure a Fast Fourier Transform (FFT) size to the UE or the UE may additionally report the FFT size to the eNB.

In Equation 19, a value of υ as an oversampling value of (FFT size) may have a specific integer value (e.g., 1, 2, 4, . . . ) (may have a property of a system parameter irrespective of a specific beam) and this may be configured automatically according to (i.e., in link with) the numerology or configured to the UE by the eNB.

Last, in Equation 19, $\lambda_l$ is a value related to a phase change speed in the configured bandwidth (BW) per beam and for example, $\lambda_l=2$ may mean that a phase of an l-th beam is changed by 4 pi (π) in the configured bandwidth. The $\lambda_l$ value may have a specific integer value (e.g., 1, 2, 4, . . . ) and may be configured to the UE by the eNB or may be fed back to the eNB for each beam in a set which the $\lambda_l$ value may have by the UE.

As one embodiment of a scheme of estimating the $$\delta_l = \frac{\lambda_l}{\upsilon\eta}$$

value of Equation 19 above, when the UE defines a channel represented by each subcarrier or RB as $H(k) \in C^{N_R \times N_T}$, a basis matrix W1 for linear combination is projected to $H(k)$ to obtain values represented by each subcarrier or RB.

$$H(k)=U_k \Sigma_k V_k^H,$$

$$U_k \in C^{N_R \times N_r}, \Sigma_k=[\Sigma_k 0] \in C^{N_r \times N_t}(\Sigma_k \in C^{N_r \times N_r}), V_k=[v_{k1}, \ldots, v_{kN_T}] \in C^{N_T \times N_t}$$ [Equation 20]

In this case, an eigen vector of each channel may be calculated through a single value decomposition (SVD) function as shown in Equation 20 above. In Equation 20, U and V represent unitary matrices, and $\bar{\Sigma}_k$ represents a diagonal matrices in which diagonal elements are eigen values. Here, the channel represented by rank 1 of the channel H_k may be expressed as an eigen vector of v_k1 (If the rank is R, the r-th layer may adopt the r-th eigen vector (v_kr)).

$$c_k = (W_1^H W_1)^{-1} W_1^H v_{k1} \quad \text{[Equation 21]}$$

Accordingly, a term corresponding to a phase per beam may be calculated by projecting a channel value to the basis for beam combining using an equation such as Equation 21.

In Equation 21, $c_k$ as a value corresponding to the phase and amplitude of each beam of the k-th channel may be expressed as Equation 22 below.

$$c_k = \begin{bmatrix} p_{k,1} e^{\theta_{k,1}} \\ p_{k,2} e^{\theta_{k,2}} \\ \vdots \\ p_{k,2L} e^{\theta_{k,2L}} \end{bmatrix} \quad \text{[Equation 22]}$$

The leading beam is relatively expressed as shown in Equation 23 below.

Alternatively, assuming that the best beam, in the previous example, the best preferred beam is re-ordered so that the first beam or the best beam comes first, or when each polarization has different power, a polarization order may be changed according to which polarization leading beam is large, which may be know as 1 bit.

$$\bar{c}_k = \begin{bmatrix} 1 \\ \bar{p}_{k,2} e^{-\theta_{k,2}} \\ \vdots \\ \bar{p}_{k,2L} e^{-\theta_{k,2L}} \end{bmatrix} \quad \text{[Equation 23]}$$

In Equation 23, the polarization order may be expressed as $\bar{\theta}_{k,j} = \theta_{k,j} - \theta_{k,1}$ and $$\bar{p}_{k,j} = \frac{p_{k,j}}{p_{k,1}}.$$

Accordingly, the polarization order is expressed as shown in Equation 24 below.

$$C = [\bar{c}_1, \bar{c}_2, \ldots, \bar{c}_{N_{RB}}] \in \mathbb{C}^{2L \times N_{RB}} \quad \text{[Equation 24]}$$

Here, $N_{RB}$ is expressed as the number of RBs for convenience of expression, but may be appreciated as the number of samples used on the frequency axis. By applying an inverse fast Fourier transform (IFFT) for each l-th row of Equation 24, if the index with the largest peak in the time domain is found, the finding corresponds to the maximum delay of the time domain in the index, which may be calculated as shown in Equation 25 below.

$$\delta_l = \frac{\lambda_l}{v\eta} = \frac{\text{Index}_{peak}}{FFT_{size}} \quad \text{[Equation 25]}$$

In addition, the amplitude and phase values of a complex scalar value of the corresponding time domain index may be calculated as $\rho_l$ and $\varepsilon_l$ of the l-th beam, respectively.

In addition, a scheme may be used in which for feedback for the above values, the $\delta_l$ value itself is quantized or the FFT size (may be previously promised between the UE and the eNB or may be configured to the UE by the eNB or reported to the eNB by the UE) and the index is reported. In addition, the $\rho_l$ and $\varepsilon_l$ values may also be quantized with granularity which is previously promised (or configured) by the UE and fed back. Therefore, the expression scheme corresponds to a scheme of independently feeding back the values to polarization. In the above equation, a scheme of calculating delay parameters of 2L beams for the structure of $$W_1 = \begin{bmatrix} B_1 & 0 \\ 0 & B_2 \end{bmatrix},$$

i.e., for a case where each polarization has different beam groups is described, but one polarization may be calculated according to a codebook configuring scheme to be described below and then a beam combination of the opposite polarization may be calculated through an operation such as co-phase, etc.

The remaining parameters in Equation 18 may be defined/configured as follows.

As described above, the k index is an index value corresponding to a frequency used for SB reporting, and may be configured for a given subcarrier or SB, which may not be additionally reported.

$\varepsilon_l$ denotes a phase offset value of the l-th beam and for example, like $$\varepsilon_l = \left\{0, \frac{j\pi}{4}, \frac{j2\pi}{4}, \frac{j3\pi}{4}\right\} \text{ or } \varepsilon_l = \left\{0, \frac{j\pi}{8}, \ldots \frac{j7\pi}{8}\right\},$$

a phase offset per beam may be configured to have values such as QPSK, 8PSK, etc. Alternatively, the feedback overhead may be reduced by ignoring the phase offset (i.e., configured to zero). Alternatively, in order to reduce feedback bits, the UE may report a differential between the offset of the lead beam and offsets of second and third beams, etc. That is, for example, when it is assumed that the offset of the leading beam is 3-bit feedback, the differential may be performed with granularity smaller than the 3-bit feedback, e.g., 1-bit feedback.

Figure 19:
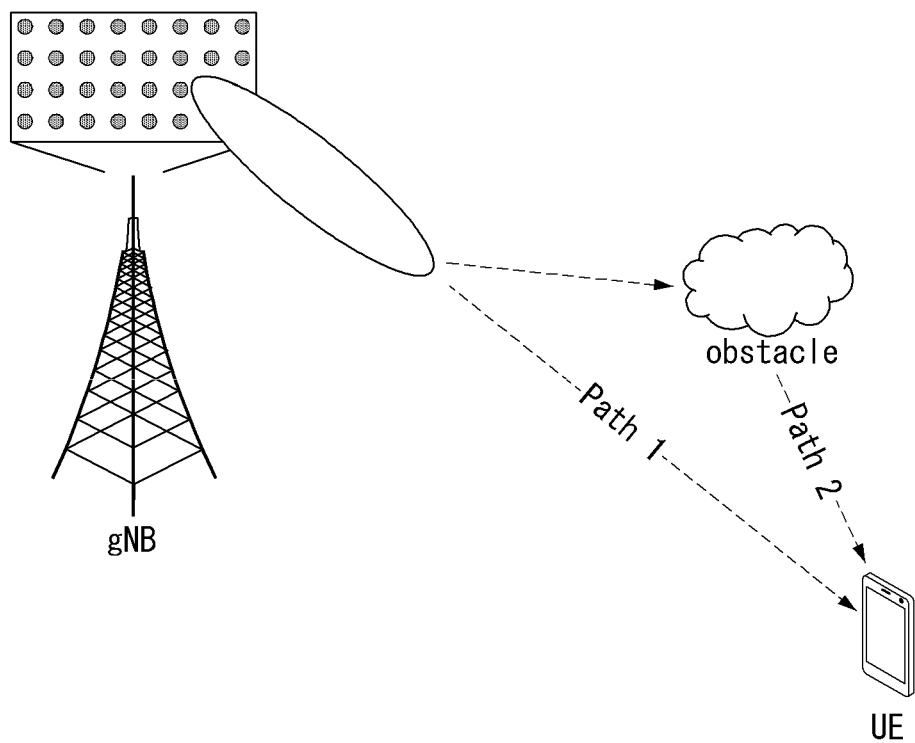
FIG. 19 is a diagram illustrating multiple paths in a wireless communication system to which the present disclosure may be applied.

FIG. 19 is a diagram illustrating multiple paths in a wireless communication system to which the present disclosure may be applied.

As the above-described scheme, a method for configuring the codebook by assuming that there is one dominant delay for each 2L DFT beams corresponding to each basis. However, as illustrated in FIG. 19, in frequency selectivity, the same beam may go through different delays due to a phenomenon such as diffraction/refraction caused by obstacles and may be received by the UE. When the beam is a beam which a reception strength is dominant, if only one dominant delay is considered, the UE configures the codebook only with a part of power of the received beam, so performance degradation is expected.

Therefore, an embodiment of the present disclosure proposes a scheme of configuring the codebook in consideration of most of the power of the beam corresponding to each basis.

To this end, a general configuration scheme of the codebook first proposed is expressed again as in Equation 26 below.

$$\begin{bmatrix} B_1 & 0 \\ 0 & B_2 \end{bmatrix} = \begin{bmatrix} b_{1,1}, b_{1,2}, \ldots, b_{1,L} & 0 \\ 0 & b_{2,1}, b_{2,2}, \ldots, b_{2,L} \end{bmatrix} = \quad \text{[Equation 26]}$$

$$[\bar{b}_1, \ldots, \bar{b}_{2L}] \in C^{2N_1 N_2 \times 2L}$$

$$\text{Where } \bar{b}_i = \begin{cases} \begin{bmatrix} b_{1,i} \\ 0 \end{bmatrix} & \text{for } i = 1, \ldots, L \\ \begin{bmatrix} 0 \\ b_{2,i-L} \end{bmatrix} & \text{for } i = L+1, \ldots, 2L \end{cases}$$

In Equation 26, the structure of the rank 1 codebook of the k-th subcarrier (or RB index) is represented by Equation 27 below.

$$W_k^{(1)} = [\bar{b}_1, \ldots, \bar{b}_{2L}]c = [\bar{b}_1, \ldots, \bar{b}_{2L}] \begin{bmatrix} p_1 e^{-j2\pi k \delta_1 + \varepsilon_1} \\ p_2 e^{-j2\pi k \delta_2 + \varepsilon_2} \\ \vdots \\ p_{2L} e^{-j2\pi k \delta_{2L} + \varepsilon_{2L}} \end{bmatrix} \quad \text{[Equation 27]}$$

Alternatively, the structure is divided into the relative size of the leading beam as in Equation 28 below.

$$W_k^{(1)} = [\bar{b}_1, \ldots, \bar{b}_{2L}]c = [\bar{b}_1, \ldots, \bar{b}_{2L}] \begin{bmatrix} 1 \\ \bar{p}_2 e^{-j2\pi k \bar{\delta}_2 + \bar{\varepsilon}_2} \\ \vdots \\ \bar{p}_{2L} e^{-j2\pi k \bar{\delta}_{2L} + \bar{\varepsilon}_{2L}} \end{bmatrix} \quad \text{[Equation 28]}$$

Here, $\bar{p}$, $\bar{\delta}$, $\bar{\varepsilon}$ correspond to parameters divided by the leading beam parameter.

Although the above description is mainly focused on rank 1, in the case of rank>1, the above structure may be independently calculated for each layer to configure the codebook. This is to better reflect the characteristics of the channel using the codebook.

Scheme 1: Selecting N strong beams including the same beam having different delays (Here, N may be configured irrespective of 2L. That is, N may be configured smaller than 2L or larger than 2L.)

When using the above scheme, the structure may be expressed as in Equation 29 below.

$$W_k^{(1)} = [\bar{b}_1, \ldots, \bar{b}_{2L}]Sc = [\bar{b}_1, \ldots, \bar{b}_{2L}]S \begin{bmatrix} p_1 e^{-j2\pi k \delta_1 + \varepsilon_1} \\ p_2 e^{-j2\pi k \delta_2 + \varepsilon_2} \\ \vdots \\ p_N e^{-j2\pi k \delta_N + \varepsilon_N} \end{bmatrix} \quad \text{[Equation 29]}$$

Here, the structure may include a case of normalizing to the leading or best beam described above in order to reduce the amount of feedback. In Equation 29, S represents a matrix in which 2L beams are mapped to N beams. That is, the matrix is shown in Equation 30 below.

$$S = [e_{s_1}, e_{s_2}, \ldots, e_{s_N}] \in C^{2L \times N} \quad \text{[Equation 30]}$$

In Equation 30, $e_j$ as a selection vector in which only the j-th element is 1 means an index of an i-th preferred beam as $s_i \in \{1, 2, \ldots, 2L\}$ (i=1, ..., N) when all delays per beam are considered.

For example, if 64 IFFT is considered, 64 delay taps are provided for each beam and the index of the i-th preferred beam among a total of 2L*64 (beam, delay) pairs may be represented. In the case of L=2 and N=2, when the second tap and the tenth tap of the first beam are calculated/selected by the UE as the most preferred beam, $$S = \begin{bmatrix} 1 & 1 \\ 0 & 0 \\ 0 & 0 \\ 0 & 0 \end{bmatrix} \text{ and } \delta_1 = \frac{2}{64}, \delta_2 = \frac{10}{64}$$

may be calculated.

Scheme 1-1: In the case of scheme 1 described above, feedback of information on selection of N best beams may become a problem as the values of L and N increase. That is, there is a problem that the number of cases of $(2L)^N$ should be fed back.

Therefore, in order to solve the problem, the UE may select and feed back the number of taps selected by W consecutive or specific rules per beam. Such a case may be effective when most power is concentrated near a maximum delay tap. Alternatively, it may be advantageous to reflect most of the signal power when the IFFT is greatly oversampled by oversampling.

Figure 20:
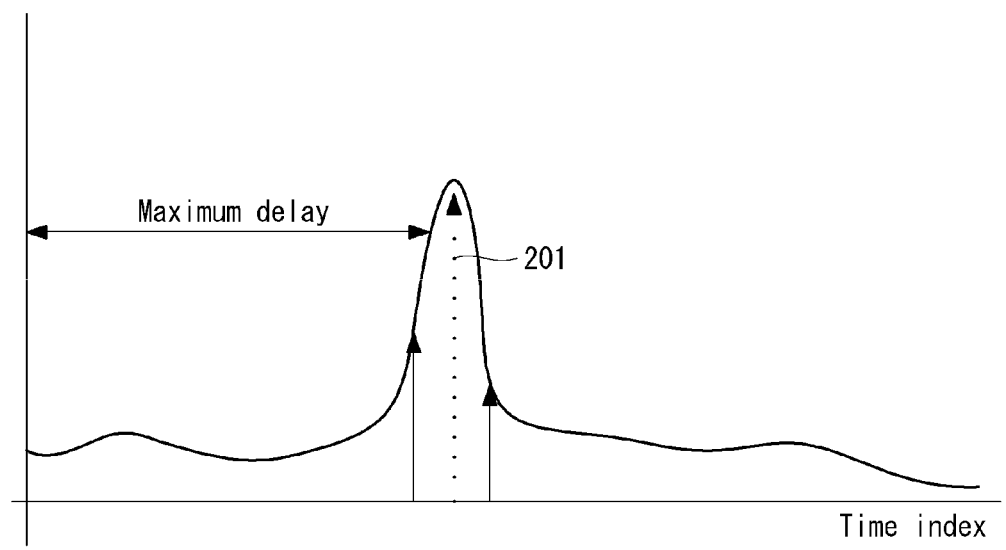
FIG. 20 is a diagram showing a time domain response in a wireless communication system to which the present disclosure may be applied.

FIG. 20 is a diagram showing a time domain response in a wireless communication system to which the present disclosure may be applied.

FIG. 20 illustrates a time domain signal obtained by IFFT of frequency domain samples and a dotted line arrow 201 shows a maximum delay. In this case, when samples for three taps including even both sides (i.e., W=3) should be taken rather than taking only the sample corresponding to the tap corresponding to the dotted line arrow 201, samples of the frequency domain may be more accurately decoded. In this case, if only one index corresponding to the best tap per beam is fed back, $$\delta_l = \frac{\lambda_l}{v\eta} = \frac{\text{Index}_{peak}}{FFT_{size}}$$

for W−1 remaining taps may be calculated. Even in this case, a value of $p_l, \varepsilon_l$ needs to be separately fed back to the eNB. Accordingly, the eNB may configure the UE whether to feed back information on the size of W, i.e., how many taps per beam to the eNB or according to which W taps are to be selected. In the case of the number of Ws, the UE measures the channel and when a larger W is fed back when the delay spread is large or a smaller W value is fed back when the delay spread is small. At this time, the size of W may also be fed back to the eNB. As a result, the overhead of the feedback may be effectively reduced.

Scheme 2: Scheme in which W delay taps are fed back with respect to K strong beams and 1 maximum delay tap is fed back with respect to 2L-K beams The scheme is an effective scheme for properly reflecting the feedback overhead and trade-off of performance and a principle is applied in which most frequency selectivity is determined by the dominant specific beam and such a property is better suited for millimeter wave (mmwave) having stronger straightness. Parameters other than the scheme of selecting K strong beams may be calculated by the scheme described above.

The scheme of selecting K strong beams may be indicated by permutations. That is, when K=2, the UE may feed back information corresponding to the number of total cases which corresponds 2L*(2L−1) to the eNB and inform the eNB of the information. Alternatively, if the orthogonal bases are arranged in the order of the dominant beams, the feedback for K additional beam indications described above may be omitted. In addition, the UE may additionally feed back information (K value may be calculated by measuring the channel and measuring a correlation of the channel and the beams constituting the basis by the UE or when a value of reported p_1 exceeds a specific value, e.g., 0.5, the information may be regarded as the dominant beam) on the K value or may previously promise the K value with the eNB. Alternatively, regardless of $B_1=B_2$, $B_1 \neq B_2$, there may be a case where power is concentrated in a specific polarization for a specific channel. If the bases are aligned for each polarization, for the best beam selection (from the basis), the UE may additionally inform the eNB of which polarization (H slant or V slant) prevails by using 1 bit with respect to best beam selection (basis).

The eNB may inform the UE of which scheme is to be used among the above proposed schemes through the higher layer signaling.

Until now, a scheme of calculating delay parameters independently for each polarization has been proposed. In this case, the UE should feed back parameters to the eNB for 2L−1 (or N−1 in the case of proposal 1) beams. In order to effectively reduce the overhead of such feedback, a scheme of configuring the codebook using the LTE codebook structure will be described below.

W2 may play a role of beam combining and co-phase configured by W1. Then, rank 1 codebook may be configured as shown in Equation 31 below.

$$W_2 = \begin{Bmatrix} 1_L \\ \phi_n 1_L \end{Bmatrix} \qquad \text{[Equation 31]}$$

where $\phi_n \in \{1, j, -1, -j\}$ or 8 PSK, $1_L$ is all one vector with length L In Equation 31, 1_L has a length of L and is a vector (all one vector) in which all elements are 1. For example, $1_2 = [11]^T$ is represented. Then, a finial codebook form is shown in Equation 32 below.

$$W^{(1)} = \frac{1}{\sigma} W_1 W_2 = \frac{1}{\sigma} \begin{bmatrix} \sum_{l=1}^{L} p_l b_l e^{-j2\pi k \delta_l + \varepsilon_l} \\ \phi_n \sum_{l=1}^{L} p_l b_l e^{-j2\pi k \delta_l + \varepsilon_l} \end{bmatrix} (\text{where } p_1 = 1) \qquad \text{[Equation 32]}$$

In Equation 32, $\sigma = \sqrt{2(1+p_2^2+...+p_L^2)}$ represents a normalize term. Further, since a phase component may be expressed as a relative value for a first beam, $\delta_1 = 0$, $\varepsilon_1 = 0$ may be configured and the feedback amount thereof may be reduced.

In the case of Rank 2 codebook, two following alternatives may be considered.

Alternative 1 is shown in Equation 33 below.

$$W_2 = \begin{bmatrix} 1_L & 1_L \\ \phi_n 1_L & -\phi_n 1_L \end{bmatrix} \phi_n \in \{1, j\} \text{ or } \qquad \text{[Equation 33]}$$

$$\left\{1, \frac{1+j}{\sqrt{2}}, j, \frac{-1+j}{\sqrt{2}}\right\}$$

Then, the final codebook form is shown in Equation 34 below.

$$W^{(2)} = \frac{1}{\sigma} W_1 W_2 \qquad \text{[Equation 34]}$$

In Equation 34, $\sigma = 2\sqrt{(1+p_2^2+...+p_L^2)}$ represents the normalize term.

In the case of alternative 1 above, the rank 2 codebook is designed by configuring a Walsh-code in order to reduce feedback bits while securing orthogonality by using the rank 1 codebook. When such a scheme is used, it is advantageous in that the feedback bits are constant or reduced (according to granularity of co-phase) as compared with layer 1.

Alternative 2 is shown in Equation 35 below.

[Equation 35]

$$W_2 = \begin{bmatrix} 1_L & 1_L \\ \phi_n 1_L & \phi_n 1_L \end{bmatrix} \text{ where } \phi_n \in \{1, j, -1, -j\} \text{ or } 8\,\text{PSK}$$

In the case of the scheme of alternative 2, a case is considered in which linear combining is independently configured for each layer. In this case, since the vectors constituting Layer 1 and Layer 2 of the final Rank 2 codebook differ with a very high probability, higher co-phase granularity is configured.

Designing the rank 2 codebook using alternative 2 described above may be configured as shown in Equation 36 below independently for each layer by the scheme of configuring W1.

$$B^{(r)} = [b_1^{(r)} e^{-j2\pi k \delta_1^{(r)} + \varepsilon_1^{(r)}}, \\ p_2^{(r)} b_2^{(r)} e^{-j2\pi k \delta_2^{(r)} + \varepsilon_2^{(r)}}, \dots, \\ p_L^{(r)} b_L^{(r)} e^{-j2\pi k \delta_L^{(r)} + \varepsilon_L^{(r)}}] (\in C^{N_1 N_2 \times L}) \qquad \text{[Equation 36]}$$

In Equation 36, r=1, 2.

In the case of r=1, the value of $b_1^{(1)}$ represents the lading beam index. However, in the case of $b_1^{(2)}$, $b_1^{(1)}$ may be used as it is or independently configured/applied. $\delta_l^{(r)}$ may be appreciated as a value configured according to $b_l^{(r)}$. That is, one $\delta_l^{(r)}$ value exists in a specific $b_l^{(r)}$ beam. The adjustment/scaling factor may normalized by using $\sigma^{(r)} = 2\sqrt{(1+p_2^{(r)2}+...+p_L^{(r)2})}$ with respect to a column (i.e., the power of the final codebook is normalized to 1). That is, when using alternative 2 above, depending on the layer, the beams (beam group/power per beam) constituting W1 are applied differently. A final codebook is shown in Equation 37 below.

$$\begin{bmatrix} \frac{1}{\sigma^{(1)}} \sum_{l=1}^{L} p_l^{(1)} b_l^{(1)} e^{-j2\pi k \delta_l^{(1)} + \varepsilon_l^{(1)}} & \frac{1}{\sigma^{(2)}} \sum_{l=1}^{L} p_l^{(2)} b_l^{(2)} e^{-j2\pi k \delta_l^{(2)} + \varepsilon_l^{(2)}} \\ \frac{\phi_n}{\sigma^{(1)}} \sum_{l=1}^{L} p_l^{(1)} b_l^{(1)} e^{-j2\pi k \delta_l^{(1)} + \varepsilon_l^{(1)}} & \frac{-\phi_n}{\sigma^{(2)}} \sum_{l=1}^{L} p_l^{(2)} b_l^{(2)} e^{-j2\pi k \delta_l^{(2)} + \varepsilon_l^{(2)}} \end{bmatrix} \qquad \text{[Equation 37]}$$

In the above structure, the scheme of independently calculating the parameter for each polarization/layer may be applied as shown in Equation 38 below and here, $\sigma^{(r)} = \sqrt{2(1+p_2^{(r)2}+\ldots+p_{2L}^{(r)2})}$ may be represented.

$$W^{(2)} = [w_1^{(2)} w_2^{(2)}] = \begin{bmatrix} \frac{1}{\sigma^{(1)}} \sum_{l=1}^{L} p_l^{(1)} b_l^{(1)} e^{-j2\pi k \delta_l^{(1)} + \varepsilon_l^{(1)}} & \frac{1}{\sigma^{(2)}} \sum_{l=1}^{L} p_l^{(2)} b_l^{(2)} e^{-j2\pi k \delta_l^{(2)} + \varepsilon_l^{(2)}} \\ \frac{1}{\sigma^{(1)}} \sum_{l=1}^{2L} p_l^{(1)} b_l^{(1)} e^{-j2\pi k \delta_l^{(1)} + \varepsilon_l^{(1)}} & \frac{1}{\sigma^{(2)}} \sum_{l=L+1}^{2L} p_l^{(2)} b_l^{(2)} e^{-j2\pi k \delta_l^{(2)} + \varepsilon_l^{(2)}} \end{bmatrix}$$ [Equation 38]

For efficient feedback of the codebook proposed in the present disclosure, higher granularity parameter quantization may be performed for K dominant beams among a total of 2L beams that are linearly combined. Alternatively, feedback may be performed through quantization only for beam indexes exceeding a specific threshold (e.g., power level). Here, the threshold and or K may be configured to the UE through the higher layer (e.g., RRC) or the UE may report to the eNB the number of beams that exceed the specific threshold.

When the above proposed method is used, SB CQI may be calculated by using a method such as averaging and reported to the ENB, by using PMI applied at RE-level by $e^{-j2\pi k \delta_l}$.

More specifically, the PMI estimation operation of the UE is as follows. The channel represented by each subcarrier (SB) is defined as $H(k) \in C^{N_R \times N_T}$. Here, N_R and N_T represent antenna ports (or antenna elements, hereinafter, collectively referred to as antenna ports) of the UE and the eNB, respectively. The UE may estimate the number (the number of L and/or N and/or W (the number of delay taps)) of beams for configuring the PMI, beam selection (leading beam+combining beam, or beam array (e.g., an array depending on the power of the beam)), a phase change factor $\delta_l$ and an offset $\varepsilon_l$ per beam depending on a relative power indicator $p_l$, frequency, and the like, by using H(k) for each subcarrier. In addition, the UE may feed back the above-described factors representing the WB to the eNB integratedly or independently, and the eNB may configure the PMI.

Accordingly, the present disclosure proposes a scheme in which the CQI is calculated and reported in units of SB or WB/partial band (PB) (e.g., the PB is a set of multiple PRBs). Whether the unit is SB or WB/PB may be configured/applied to be configurable. Alternatively, the amount of feedback may be reduced by reporting the differential SB CQI (e.g., 1 bit) from the WB CQI.

In case of using the proposed scheme, in order to obtain the CSI of the UE, only the partial band is configured and the CSI-RS is transmitted and even though it is assumed that data is transmitted over a wider band, the beam selection (leading beam+combining beam), and the phase change factor $\delta_l$ and the offset $\varepsilon_l$ per beam depending on the relative power indicator $p_l$, frequency are estimated in the configured partial band to configure the codebook. Further, the PMI for the entire band in which the data is transmitted may be estimated by using scalability characteristics.

In the case of the proposed scheme, even if there is no SB report, the frequency selectivity of the configured bandwidth may be known. The frequency selectivity is may be used for periodic/aperiodic/semi-persistent CSI reporting through class A or B. Further, in a hybrid scheme such as class A+B or class B+B, the frequency selectivity may be used even for accurate channel feedback for each SB or RB.

In addition, both layers 1 and 2 share the same beam group, and the codebook may be configured by adjusting portions of phase (and/or amplitude) change that is combined per layer, which is represented by Equation 49 or 40 below.

$$\begin{bmatrix} \frac{1}{\sigma^{(1)}} \sum_{l=1}^{L} p_l b_l e^{-j2\pi k \delta_l^{(1)} + \varepsilon_l^{(1)}} & \frac{1}{\sigma^{(2)}} \sum_{l=1}^{L} p_l b_l e^{-j2\pi k \delta_l^{(2)} + \varepsilon_l^{(2)}} \\ \frac{\phi_n}{\sigma^{(1)}} \sum_{l=1}^{L} p_l b_l e^{-j2\pi k \delta_l^{(1)} + \varepsilon_l^{(1)}} & \frac{-\phi_n}{\sigma^{(2)}} \sum_{l=1}^{L} p_l b_l e^{-j2\pi k \delta_l^{(2)} + \varepsilon_l^{(2)}} \end{bmatrix}$$ [Equation 39]

$$\begin{bmatrix} \frac{1}{\sigma^{(1)}} \sum_{l=1}^{L} p_l^{(1)} b_l e^{-j2\pi k \delta_l^{(1)} + \varepsilon_l^{(1)}} & \frac{1}{\sigma^{(2)}} \sum_{l=1}^{L} p_l^{(2)} b_l e^{-j2\pi k \delta_l^{(2)} + \varepsilon_l^{(2)}} \\ \frac{\phi_n}{\sigma^{(1)}} \sum_{l=1}^{L} p_l^{(1)} b_l e^{-j2\pi k \delta_l^{(1)} + \varepsilon_l^{(1)}} & \frac{-\phi_n}{\sigma^{(2)}} \sum_{l=1}^{L} p_l^{(2)} b_l e^{-j2\pi k \delta_l^{(2)} + \varepsilon_l^{(2)}} \end{bmatrix}$$ [Equation 40]

Alternatively, the UE may report the subset of the above-described factors for configuring the PMI to the eNB and the eNB may configure the PMI using the information (assuming that the remaining information is defined in advance).

When using the codebook proposed above, the PMI may be selectively configured/applied at the RE/RB/SB level and the corresponding CQI may also be reported with the same frequency granularity. However, in this case, there is a disadvantage in that the payload size of the CQI is increased by frequency granularity.

A case of $B_1 \neq B_2$ indicates a case in which different beam groups are configured for each polarization. In this case, the number of feedback bits may be doubled, but there is an advantage that more sophisticated feedback may be performed because different beam combinations may be applied per polarization. $B_1 \neq B_2$ may be extensively applied similarly to the method for configuring the codebook independently for each layer. In the case of $B_1 \neq B_2$, reporting the co-phase per SB may be more precisely performed by using the above-described W2 configuration scheme as it is.

Alternatively, when the W2 reporting is not performed, the following determined W2, e.g., $$W_2 = \begin{bmatrix} 1_L \\ 1_L \end{bmatrix}$$

for rank 1, $$W_2 = \begin{bmatrix} 1_L & 1_L \\ 1_L & -1_L \end{bmatrix}$$

for rank 2, or $$W_2 = \begin{bmatrix} 1_L & 1_L \\ 1_L & 1_L \end{bmatrix}$$

may be used.

In the case of the proposed codebook (a design independent of the layer and/or similar to class A codebook), orthogonality between the layers may not be satisfied due to quantization error. In this case, performance loss occurs. In order to prevent the performance loss, the present disclosure proposes that a processing procedure of calculating the codebook by the above-described configuration scheme and then, maintaining orthogonality for each layer is added. As a representative scheme, QR decomposition or Gram-Schmidt scheme may be used. Hereinafter, the normalization scheme by the Gram-Schmidt scheme will be described. Each of two layers $w_1^{(2)}$, $w_2^{(2)}$ acquired by the above equation may be defined as in Equation 41 below.

[Equation 41]
$$u_1 = w_1^{(2)}$$
$$u_2 = w_2^{(2)} - \frac{u_1^H w_2^{(2)}}{u_1^H u_1} u_1$$

Then, $u_1$, $u_2$ are orthogonal to each other. Accordingly, the final rank 2 codebook may be configured as shown in Equation 42 below.

$$W^{(2)} = [\bar{u}_1 \bar{u}_2], \; \bar{u}_1 = \frac{u_1}{\sqrt{2}\|u_1\|} \quad \text{[Equation 42]}$$

The orthogonalization process may be extended even in rank 2 or higher, and represented by Equation 43 below.

$$u_k = w_k^{(2)} - \sum_{j=1}^{k-1} \frac{u_j^H w_k^{(2)}}{u_j^H u_j} u_1 \quad \text{[Equation 43]}$$

In Equation 43, k represents a k-th layer. Information on the orthogonalization process by the above scheme does not need to be additionally reported to the eNB. That is, when the UE reports the parameters for configuring Equation 38 to the eNB, the eNB may reconstruct Equation 38 using the reported parameters and decode the final codebook by the proposed orthogonalization process.

In this case, the CQI reported to the eNB by the UE corresponds to the CQI calculated using the final codebook which undergoes the orthogonalization process. That is, in this case, the orthogonalization process corresponds to a default element of the codebook component, so that the UE and the eNB may both promise to perform the orthogonalization process. If the UE reports additionally whether orthogonalization is performed to the eNB (when not performing orthogonalization, CQI is a CQI calculated without orthogonalization), or when it is assumed that a predetermined layer is as u_1, the UE may additionally feed back to the eNB whether the orthogonalization is performed or which orthognalization scheme is used or the UE and the ENB may promise whether the orthogonalization is performed or which orthognalization scheme is used with each other in advance.

In the case of the proposed codebook, since there may be many dominant beams in an environment having a large delay spread, it is preferable that a value of 2L or N (number of beams to be combined) in the proposal is large. Alternatively, in the case of a system having numerology having relative larger selectivity, it is advantageous that the value of N is large. The value of N may be previously promised between the UE and the eNB as different values of L or N according to the numerology, or may be configured/applied to the UE in accordance with the numerology by the eNB. In addition, the channel estimation is influenced by the CSI-RS density, and, in order to correct the resulting performance, when the CSI-RS density is low, the FFT size for the proposed codebook configuration may be configured to be relatively larger than the CSI-RS density (>=1 RE/RB/port), or oversampling may be configured/applied large, or the value of L or N and/or quantization granularity (amplitude and/or phase) are configured relatively large.

Alternatively, in the case of a system having a large bandwidth, even if 2L or N is increased, it may be difficult to properly reflect the frequency selectivity due to delay spread. In this case, by dividing the configured bandwidth into M (commonly referred to as a sub-band group (SBG)), the proposed codebook may be constituted by a group of SBs or a group of RBs. At this time, as an example of M, values such as M=1, 2, 3 may be configured/applied.

Figure 21:
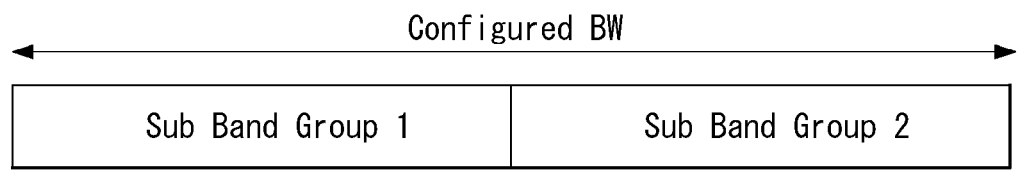
FIG. 21 is a diagram illustrating two subband groups according to an embodiment of the present disclosure.

FIG. 21 is a diagram illustrating two subband groups according to an embodiment of the present disclosure.

FIG. 21 illustrates a case where two SBG1s and SBG2s are configured as the configured bandwidth are configured. In this case, the proposed codebook may be applied independently according to two SBGs. In order to save the payload, the UE and the eNB may promise to use the same basis per SBG with each other.

For codebook designs using the orthogonal basis described above, the number of ports, X is advantageously large. However, when the number of ports is small, for example, when X=2 or 4, or there are no orthogonal basis or two orthogonal bases, it may be slightly inefficient to use the above-described design scheme.

In this case, it may be efficient to configure the codebook using delay per port (i.e., representing a delay per port where digital beamforming is not performed, rather than the concept of delay of the beam configured by the basis) by using the delay per port rather than using the basis. This is represented as in Equation 44 below.

[Equation 44]
$$v_{X,i} = \frac{1}{\sqrt{1 + p_1 + \ldots + p_{X-1}}} \begin{bmatrix} 1 \\ p_1 \exp(-j2\pi k\delta_1 + \varepsilon_1) \\ \vdots \\ p_{X-1} \exp(-j2\pi k\delta_{X-1} + \varepsilon_{X-1}) \end{bmatrix} \in C^{X \times 1}$$

The codebook configuration illustrates rank 1, and rank 2 or more may be extended and applied through a class A-like design or an independent design for each layer in the above-described scheme. Hereinafter, a $\delta_i$, $p_i$, $\varepsilon_i$ calculation scheme follows one of the above-described schemes.

Whether a port wise codebook configuration scheme is to be used or whether the orthogonal basis using the codebook such as DFT is to be used may be notified to the UE through the higher layer signaling by the eNB. Alternatively, a Y value for determining an X (<Y)-port to which the port wise codebook configuration scheme may be promised between the UE and the eNB in advance or the eNB may inform the UE of the Y value through the higher layer signaling.

The proposed codebook is described primarily based on downlink, but may be similarly applied even in uplink for a sophisticated transmit PMI (TPMI) indication.

Hereinafter, the present disclosure proposes an efficient operation of an LC codebook represented as a linear combining codebook proposed in release (Rel)-14 enhanced full dimension MIMO (eFD-MIMO) different from the new codebook design scheme.

The LC codebook of Rel-14 is configured as below.

$$W_1 = \begin{bmatrix} B & 0 \\ 0 & B \end{bmatrix}, B = \begin{bmatrix} p_0 b_{k_1^{(0)}, k_2^{(0)}}, \ldots, p_{L-1} b_{k_1^{(L-1)}, k_2^{(L-1)}} \end{bmatrix}$$

- For rank 1 : $W = \begin{bmatrix} \tilde{w}_{0,0} \\ \tilde{w}_{1,1} \end{bmatrix} = W_1 W_2$, and $W_2 = \begin{bmatrix} c_{0,0} \\ c_{1,0} \end{bmatrix}$

- For rank 2 : $W = \begin{bmatrix} \tilde{w}_{0,0} & \tilde{w}_{0,1} \\ \tilde{w}_{1,0} & \tilde{w}_{1,1} \end{bmatrix} = W_1 W_2$, and $W_2 = \begin{bmatrix} c_{0,0} & c_{0,1} \\ c_{1,0} & c_{1,1} \end{bmatrix}$

- $c_{r,l} = [c_{r,l,0}, \ldots, c_{r,l,L-1}]^T, r = 0, 1, l = 0, 1$

- $\tilde{w}_{r,l} = \sum_{i=0}^{L-1} b_{k_1^{(i)} k_2^{(i)}} \cdot p_i \cdot c_{r,l,i}; r = 0, 1, l = 0, 1$ In Equation 45, L (=2) represents the number of beams. $b_{k_1,k_2}$ represents a 2D DFT beam from an oversampled grid (here, $k_1=0,1,\ldots N_1 O_1-1$, $k_2=0,1,\ldots N_2 O_2-1$). $N_1$ and $N_2$ represent the numbers of antenna ports in a first dimension and a second dimension, respectively. $O_1$ and $O_2$ represent oversampling factors in the first dimension and the second dimension, respectively. $p_i$ ($0 \leq p_i \leq 1$) represents a beam power adjusting/scaling factor for beam i. $c_{r,l,i}$ represents a beam combining coefficient on beam I, polarization r, and layer r.

i) W1 beam selection
$O_1=O_2=4$ (if $N_2=1$, $O_2=1$)
$2N_1N_2 \in \{4,8,12,16,20,24,28,32\}$
Leading (stronger) beam index: $k_1^{\hat{}}(0)=0,1,\ldots,N_1O_1-1$; $k_2^{\hat{}}(0)=0,1,\ldots,N_2O_2-1$
Second (weaker) beam index: $k_1^{\hat{}}(1)=k_1^{\hat{}}(0)+O_1 d_1$; $k_2^{\hat{}}(1)=k_2^{\hat{}}(0)+O_2 d_2$; $d_1 \in \{0, \ldots, \min(N_1,L_1)-1\}$, $d_2 \in \{0, \ldots, \min(N_2,L_2)-1\}$; $(d_1,d_2) \neq (0,0)$; Here, $L_1$ and $L_2$ are defined as follows.
If $N_1 \geq N_2$ and $N_2 \neq 1$, $L_1=4$ and $L_2=2$; if $N_1 < N_2$ and $N_1 \neq 1$, $L_2=4$ and $L_1=2$; and if $N_2=1$, $L_1=8$ and $L_2=1$.
ii) W1 beam power
Second beam power is quantized with 2 bits.
$p_0=1$, $p_1 \in \{1, \sqrt{0.5}, \sqrt{0.25}, 0\}$ iii) W2
Continuously, $c_{0,0,0}=c_{0,1,0}=1$
$C_{r,1,i} \in \{1, j, -1, -j\}$, $\forall i,r,1$
First, W1 may be constituted by leading beam selection+ combining beam selection+relative power indicator. In the case of $N\_1 \cdot N\_2 > 16$, the number of orthogonal beams exceeds eight and in this case, the combined beam selection is determined within a window configured by $(L_1, L_2)=(4,2)$ or $(2,4)$ or $(8,1)$. Here, L_1 and L_2 are the numbers of orthogonal beams included in the first domain and the second domain based on the leading beam, respectively. The reason for configuring the values of L_1 and L_2 is to fit the LTE payload size.

Therefore, in a new system such as NR, a combination of (L_1, L_2) may be configurably configured/applied in order to achieve higher performance or a flexible payload size. Alternatively, the combination may be tied to an uplink payload size. That, is when the payload size is large, the combination is configured to a maximum size like (L_1, L_2)=(N_1, N_2) and when the payload is small, the combination is configured like (L_1, L_2)=(2, 2), an LC codebook may be configured. Alternatively, the UE may feed back/recommend a pattern configuration (e.g., a W1 pattern

[Equation 45]

configuring rank 508 of LTE class A codebook, i.e., configuration 2, 3, 4) for the combination of L_1 and L_2 and the set of orthogonal beams to the eNB.

Alternatively, similarly to the disclosure described above, the lead beam selection+combined beam selection+relative power indicator per layer may be differently configured and applied differently from each other.

Further, if relative power is configured to the wideband (WB) based on the leading beam, but this is configured to the subband (SB), the performance may be enhanced by sacrifice of the size of the payload. However, in this case, since the increase in payload is too large, two-step relative power may be considered as a solution therefor.

In this case, the granularity of the power coefficient may be configured to different values to reduce payload overhead. More specifically, the granularity is increased by allocating a higher bit to the WB, and in the case of the SB, smaller or equal bits may be allocated to the WB. For example, two bits may be configured to indicate the power to the WB, and one bit may be configured to indicate relative power to the SB. As an example, the case of L=2 is described. In this case, the power of the second beam may have one value of $\{1, \sqrt{0.5}, \sqrt{0.25}, 0\}$ to the WB. In addition, the UE reports one of values of $\{1, \sqrt{0.75}\}$ with 1 bit in terms of the SB to effectively increase the power granularity of the combined beam.

In this case, if the power factor for the WB is reported as 0, the UE may not report the SB power factor. In order to prevent different operations of the UE according to the above power factor, 0 may be excluded from the WB power. That is, for example, the WB power set may be configured to $\{1, \sqrt{0.5}, \sqrt{0.25}, \sqrt{0.125}\}$, and the SB power set may be configured to a value such as $\{1, \sqrt{0.5}\}$.

In addition, when performing phase combining in W2, the QFSK is considered in eFD-MIMO which is the above-described example. In this case, using 8-PSK may enhance the performance, but causes a very large increase in the total payload. In order to prevent the increase in total payload size, a method for differently configuring phase granularities of the strong combining beam and the weak combining beam may be considered.

For example, by assuming a beam in which the relative power component is configured to 1 in W1 or W2 as the strong combining beam, 8-PSK phase combining may be configured/applied to the beam and phase combining (e.g., QPSK) of granularity may be configured/applied with respect to other weak combining beams, which is relatively equal to or lower than the strong combining beam.

Alternatively, the phase combining having high granularity may be applied to the leading beam and/or the second beam and the phase combining having low granularity may be applied to other remaining combining beams. Alternatively, the eNB may inform the UE of the number of combining beams, L and the number of strong combining beams, L_S through the higher layer signaling (e.g., RRC signaling). Alternatively, the UE may feed back the granularity for the combining beam to the eNB. Such a principle is equally applicable even to a situation where the amplitude is reported at W2.

However, with respect to the indication/configuring the dominant K beam among all combining beams L, the eNB may indicate/configure K values for the UE through the higher layer signaling (e.g., RRC) or the UE may report to the eNB a beam in which a metric calculated by projecting the channel to the combining beam exceeds a specific threshold (e.g., power) together with a codebook parameter, etc. Here, the eNB may indicate/configure the specific threshold to the UE through the higher layer signaling (e.g., RRC). Alternatively, K values are tied to a power combining value which is the component of the LC codebook, and as a result, for example, the phase and/or amplitude of the higher granularity may be quantized with respect to a beam in which the p_1 value corresponds to a value equal to or more than $\sqrt{0.5}$. In addition, the proposed scheme of configuring different granularities may be independently configured/applied to the polarization and/or the layer.

Codebook Design for Category I of CSI Feedback Type II

An embodiment of the present disclosure proposes a new codebook design (i.e., frequency selective precoding feedback (FSPF)) for category I in order to reduce the payload size of the SB reporting. A main idea of the codebook design is to apply different levels of cyclic phase shift in the frequency domain. Thus, SB phase combining may be omitted in the legacy LC codebook. Accordingly, a linear combining codebook structure may be configured as shown in Equation 46 below.

$$W = \begin{bmatrix} B & 0 \\ 0 & B \end{bmatrix} c \quad \text{[Equation 46]}$$

$$B = [b_1, b_2, \ldots, b_L] (\in C^{N_1 N_2 \times L}),$$

$$c = [p_1 \exp(j2\pi k\delta_1 + \varepsilon_1) \ldots p_{2L}\exp(j2\pi k\delta_{2L} + \varepsilon_{2L})]^T (\in C^{2L \times 1})$$

The linear combining codebook is configured by the orthogonal basis and $b_i$ (i=1, . . . , L) corresponds to the 2D-DFT beam.

$p_i$ represents a relative power coefficient for an i-th beam and k represents a frequency domain index (e.g., subcarrier index, RB index). $\varepsilon_i$ represents a phase offset for the i-th beam and $\delta_i$ controls a degree of a phase shift in relation to k. $\delta_i$ is defined as shown in Equation 47 below.

$$\delta_i = \frac{\lambda_i}{\eta} \quad \text{[Equation 47]}$$

In Equation 47, $\eta$ represents a smallest number satisfying $\eta \geq N_{sc}$ (here, $N_{sc}$ represents the number of subcarriers in the configured bandwidth) in a set of $\{64, 128, 256, 512, 1024, 2048, 4096\}$. $\lambda_i$ represents an integer and for example, $\lambda_i$ $\{1,2,3,4\}$.

Without loss of generality, W in rank 1 may be expressed as in Equation 48 below.

$$W = \begin{bmatrix} b_1, b_2, \ldots, b_L & 0 \\ 0 & b_1, b_2, \ldots, b_L \end{bmatrix} \begin{bmatrix} 1 \\ p_2 e^{-j2\pi k\delta_2 + \varepsilon_2} \\ \vdots \\ p_{2L} e^{-j2\pi k\delta_{2L} + \varepsilon_{2L}} \end{bmatrix} \quad \text{[Equation 48]}$$

In Equation 48, the first column is assumed as the strongest beam. In order to determine (2L−1) parameter sets $\{p_l, \delta_l, \varepsilon_l\}$, the frequency domain sample may be calculated by projecting the basis beam(s) to a dominant eigen vector or channel matrix of the k-th subcarrier. In addition, IFFT may be applied to the frequency domain sample obtained by deriving the maximum delay $\delta_l$ for the l-th basis beam.

The sample and the phase offset $p_l$, $\varepsilon_l$ may be calculated by using a time domain sample corresponding to the maximum delay. A layer independent codebook configuration may be applied to rank 2.

Table 7 illustrates a comparison of feedback bits between the existing LC codebook of rank 1 and the proposed frequency selective precoding feedback (FSPF).

TABLE 7

| | | Proposed FSPF codebook | LC codebook |
|---|---|---|---|
| Wideband (WB) | Leading beam selection | [log$_2$ N$_1$ N$_2$ O$_1$ O$_2$] | |
| | (L-1) beam selection | [log$_2$((N$_1$N$_2$ − 1)*~*(N$_1$N$_2$ − L − 1))] | |
| | Delay parameter quantization | (2L − 1) * [log$_2$*FFT$_{size}$)] | N/A |
| | Amplitude quantization | (2L − 1)*3 | (L-1)*3 (common to amplitude and layer) |
| | Phase offset quantization | (2L − 1)*3 | N/A |

TABLE 7-continued

|  |  | Proposed FSPF codebook | LC codebook |
|---|---|---|---|
| Subband (SB) | Phase quantization (K = Number of SBs) | N/A | K*(2L − 1)*3 |

Table 7 shows the feedback bits required between the existing LC codebook and the proposed FSPF. In the case of 16 ports, L=4, K=9, $FFT_{size}$=64, and rank 1, the resulting total payload requires 99 bits in the proposed scheme and 213 bits in the existing LC codebook. In the case of rank 2, 183 bits and 402 bits are required in the proposed scheme and the existing LC codebook, respectively. This means that the proposed FSPF reduces the payload by 46% in overall.

Figure 22:
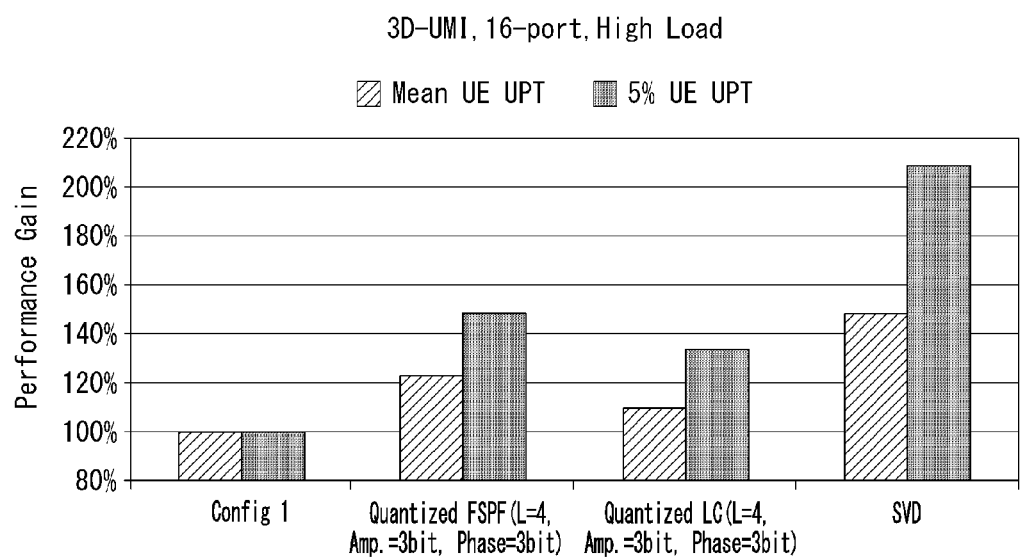
FIG. 22 is a diagram illustrating a comparison in performance among various codebook schemes.

FIG. 22 is a diagram illustrating a comparison in performance among various codebook schemes.

In FIG. 22, the performance comparison between the proposed FSPF and the existing LC codebook is illustrated. (N_1,N_2)=(2,4) and a high traffic load are assumed. In addition, it is assumed that each UE is equipped with 2 Rx antenna ports so that maximum rank 2 transmission may be considered.

In rank 2 transmission of the scheme proposed in the present disclosure, after determining the codebook parameters, additional layer orthogonality processing (e.g., Gram-Schmidt, etc.) is applied. Further, RB-level frequency domain samples are considered and it is assumed that the FFT size is 64.

As can be seen in FIG. 22, the scheme proposed in the present disclosure provides performance gains of 22% and 48% in terms of an average UE user packet throughput (UPT) and 5% UE UPT compared with class A codebook configuration 1. Further, the proposed scheme provides high performance with a reduced payload size as compared with the existing LC codebook.

Figure 23:
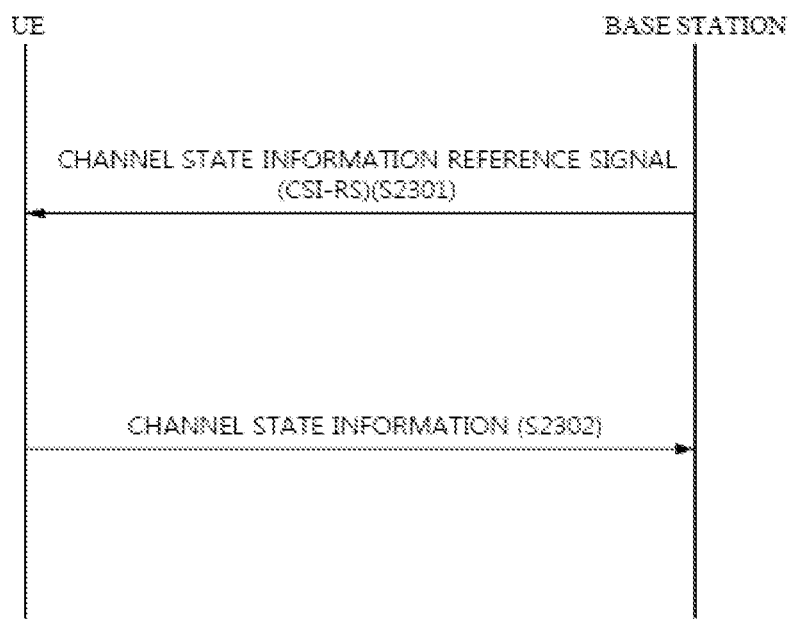
FIG. 23 is a diagram illustrating a method for transmitting and receiving channel state information according to an embodiment of the present disclosure.

FIG. 23 is a diagram illustrating a method for transmitting and receiving channel state information according to an embodiment of the present disclosure.

Hereinafter, although not specifically mentioned in the description of FIG. 23, the operation of the present disclosure described above may be applied together.

Referring to FIG. 23, the UE receives, from the eNB, a channel state information reference signal (CSI-RS) through multiple antenna ports (S2301).

The UE reports, to the eNB, channel state information (CSI) (S2302).

Here, the UE may generate (calculate) the channel state information based on the CSI-RS received from the eNB and report the channel state information to the eNB.

As described above, the channel state information may include CQI, PMI, RI, PTI, CRI, and the like.

In addition, the UE may periodically report the CSI to the eNB (e.g., on the PUCCH), and may aperiodically report the CSI to the eNB (e.g., on the PUSCH).

In particular, the UE may select a most preferred precoding matrix thereof in a linear combination codebook (LC codebook) and report information for indicating the precoding matrix to the eNB.

In the case of using the linear combination codebook (LC codebook), the precoding matrix may be generated based on a linear combination of a plurality of codewords.

In this case, the CSI may include selection information indicating a plurality of codewords used for generating a precoding matrix in a codebook for reporting the CSI, and a power coefficient, a phase offset, and a phase shift value applied to each of the plurality of codewords in terms of a configured bandwidth. In addition, the precoding matrix may be generated in units of subbands within the configured bandwidth based on the linear combination of the plurality of codewords to which a power coefficient $p_l$, a phase offset $\varepsilon_l$, and a phase change value $\delta_l$ are applied.

In this case, as shown in Equation 19 above, the phase change value may be derived from the configured in-band FFT size, the oversampling value, and the speed at which the phase of the beam formed by each of the plurality of codewords is changed.

As an example, the power coefficient, the phase offset, and the phase change value may derived in units of the subbands with respect to each of the plurality of codewords by projecting the plurality of codewords to a channel matrix in units of the subbands.

More specifically, the frequency domain sample for each of the plurality of codewords may calculated by projecting the plurality of codewords to the channel matrix in units of the subbands, and the phase change value in units of the subbands may be derived from one or more time domain samples for each of the plurality of codewords obtained by applying the IFFT to the frequency domain samples and the configured in-band FFT size.

In this case, as described above with reference to FIG. 20, a time domain sample having the strongest power value or the maximum delay value may be used as one or more time domain samples. Alternatively, as the one or more time domain samples, one or more consecutive time domain samples having the time domain sample having the strongest power value or the maximum delay value may be used. Alternatively, as the one or more time domain samples, K time domain samples having a strong power value and a time domain sample having the strongest power value or the maximum delay value among the remaining time domain samples except for the K time domain samples may be used. Here, except for a case where only the strongest power value or the maximum delay value is used, the UE may report the time domain sample (i.e., an index for the sample (tap)) selected thereby (or selected by a specific function) to the eNB.

In the case of rank 2, the linear combination may be independently applied for each precoding matrix for each layer. In this case, after the precoding matrix for each layer is generated, an orthogonal process (e.g., QR decomposition (QR) may be applied to the precoding matrix for each layer in order to maintain orthogonality for each layer. In addition, the CQI may be calculated based on a final coding matrix to which the orthogonal process is applied.

Further, in the case of rank 2, a first precoding matrix for any one layer may be generated by using the linear combination and a second precoding matrix for the remaining layer may be generated by applying an orthogonal code to the first precoding matrix.

In addition, quantization may be performed to report a parameter such as a power coefficient, a phase offset, and/or a phase change value only for a beam formed of a plurality of codewords exceeding a specific power threshold or quantization having relatively higher granularity may be performed as compared with a beam having a lower specific power threshold.

In addition, as described above with reference to FIG. 21, when the configured bandwidth is divided into a plurality of subband groups, a plurality of common codewords is used, but the precoding matrix may be generated independently for each subband group.

Further, the plurality of codewords may include a first codeword forming a leading beam and one or more second codewords forming a combining beam. At this time, in order to achieve higher performance or a flexible payload size, the combining beam may be selected within a set of beams orthogonal to the leading beam, and the set of beams orthogonal to the leading beam may be determined dependent on an uplink payload size for CSI transmission.

Overview of Devices to which Present Disclosure is Applicable

Figure 24:
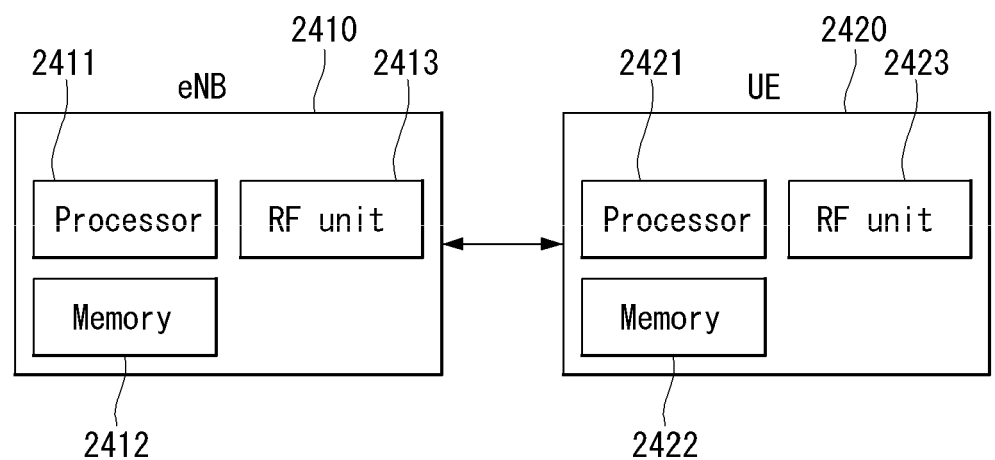
FIG. 24 illustrates a block diagram of a wireless communication apparatus according to an embodiment of the present disclosure.

FIG. 24 illustrates a block diagram of a wireless communication apparatus according to an embodiment of the present disclosure.

Referring to FIG. 24, a wireless communication system includes an eNB 2410 and multiple UEs 2410 positioned within an area of the eNB 2420.

The eNB 2410 includes a processor 2411, a memory 2412, and a radio frequency (RF) unit 2413 (or transceiver). The processor 2411 implements a function, a process, and/or a method which are proposed in FIGS. 1 to 23 above. The layers of the wireless interface protocol may be implemented by the processor 2411. The memory 2412 is connected with the processor 2411 to store various pieces of information for driving the processor 2411. The RF unit 2413 is connected with the processor 2411 to transmit and/or receive a radio signal.

The UE 2420 includes a processor 2421, a memory 2422, and an RF unit 2423 (or transceiver). The processor 2421 implements a function, a process, and/or a method which are proposed in FIGS. 1 to 23 above. The layers of the wireless interface protocol may be implemented by the processor 2421. The memory 2422 is connected with the processor 2421 to store various pieces of information for driving the processor 2421. The RF unit 2423 is connected with the processor 2421 to transmit and/or receive a radio signal.

The memories 2412 and 2422 may be positioned inside or outside the processors 2411 and 2421 and connected with the processors 2411 and 2421 by various well-known means. Further, the base station 2410 and/or the UE 2420 may have a single antenna or multiple antennas.

In the embodiments described above, the components and the features of the present disclosure are combined in a predetermined form. Each component or feature should be considered as an option unless otherwise expressly stated. Each component or feature may be implemented not to be associated with other components or features. Further, the embodiment of the present disclosure may be configured by associating some components and/or features. The order of the operations described in the embodiments of the present disclosure may be changed. Some components or features of any embodiment may be included in another embodiment or replaced with the component and the feature corresponding to another embodiment. It is apparent that the claims that are not expressly cited in the claims are combined to form an embodiment or be included in a new claim by an amendment after the application.

The embodiments of the present disclosure may be implemented by hardware, firmware, software, or combinations thereof. In the case of implementation by hardware, according to hardware implementation, the exemplary embodiment described herein may be implemented by using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

In the case of implementation by firmware or software, the embodiment of the present disclosure may be implemented in the form of a module, a procedure, a function, and the like to perform the functions or operations described above. A software code may be stored in the memory and executed by the processor. The memory may be positioned inside or outside the processor and may transmit and receive data to/from the processor by already various means.

It is apparent to those skilled in the art that the present disclosure may be embodied in other specific forms without departing from essential characteristics of the present disclosure. Accordingly, the aforementioned detailed description should not be construed as restrictive in all terms and should be exemplarily considered. The scope of the present disclosure should be determined by rational construing of the appended claims and all modifications within an equivalent scope of the present disclosure are included in the scope of the present disclosure.

INDUSTRIAL APPLICABILITY

An example is applied to the 3GPP LTE/LTE-A system is described primarily, but it is possible to apply the RRC connection method to various wireless communication systems (e.g., 5 generation (G)) system in addition to the 3GPP LTE/LTE-A system.

What is claimed is:

1. A method performed by a user equipment (UE) in a wireless communication system, the method comprising:
receiving, from a base station, a channel state information reference signal (CSI-RS) through multiple antenna ports; and
transmitting, to the base station, CSI which is obtained from the CSI-RS,
wherein the CSI includes information related to Type II CSI,
wherein the information related to Type II CSI includes i) first Precoding Matrix Indicator (PMI) information related to a plurality of Discrete Fourier Transform (DFT) vectors and ii) second PMI information related to coefficients which are combined with each of the plurality of DFT vectors,
wherein a codebook is generated based on the first PMI information and the second PMI information,
wherein the first PMI information includes information related to phase change values, and each of phase change values is related to each subband respectively, and
wherein the phase change values are combined with the plurality of DFT vectors to generate the codebook.

2. The method of claim 1, wherein the phase change values are elements of a matrix, wherein each of rows of the matrix corresponds to each subband and a number of columns of the matrix is smaller than a number of total subbands.

3. A user equipment (UE) configured to operate in a wireless communication system, the UE comprising:
a radio frequency (RF) unit;
a processor configured to control the RF unit; and
a memory operably connected to the processor and storing instructions that, when executed by the processor, perform operations comprising:
receiving, from a base station, a channel state information reference signal (CSI-RS) through multiple antenna ports; and
transmitting, to the base station, CSI which is obtained from the CSI-RS, wherein the CSI includes information related to Type II CSI, wherein the information related to Type II CSI includes i) first Precoding Matrix Indicator (PMI) information related to a plurality of Discrete Fourier Transform (DFT) vectors and ii) second PMI information related to coefficients which are combined with each of the plurality of DFT vectors, wherein a codebook is generated based on the first PMI information and the second PMI information, wherein the first PMI information includes information related to phase change values, and each of phase change values is related to each subband respectively, and wherein the phase change values are combined with the plurality of DFT vectors to generate the codebook.

4. The UE of claim 3, wherein the phase change values are elements of a matrix, wherein each of rows of the matrix corresponds to each subband and a number of columns of the matrix is smaller than a number of total subbands.

5. A method performed by a base station in a wireless communication system, the method comprising:
   transmitting, to a user equipment (UE), a channel state information reference signal (CSI-RS) through multiple antenna ports; and
   receiving, from the UE, CSI which is obtained from the CSI-RS,
   wherein the CSI includes information related to Type II CSI,
   wherein the information related to Type II CSI includes i) first Precoding Matrix Indicator (PMI) information related to a plurality of Discrete Fourier Transform (DFT) vectors and ii) second PMI information related to coefficients which are combined with each of the plurality of DFT vectors,
   wherein a codebook is generated based on the first PMI information and the second PMI information,
   wherein the first PMI information includes information related to phase change values, and each of phase change values is related to each subband respectively, and
   wherein the phase change values are combined with the plurality of DFT vectors to generate the codebook.

6. The method of claim 5, wherein the phase change values are elements of a matrix, wherein each of rows of the matrix corresponds to each subband and a number of columns of the matrix is smaller than a number of total subbands.

7. A base station configured to operate in a wireless communication system, the base station comprising:
   a radio frequency (RF) unit;
   a processor configured to control the RF unit; and
   a memory operably connected to the processor and storing instructions that, when executed by the processor, perform operations comprising:
   transmitting, to a user equipment (UE), a channel state information reference signal (CSI-RS) through multiple antenna ports; and
   receiving, from the UE, CSI which is obtained from the CSI-RS,
   wherein the CSI includes information related to Type II CSI,
   wherein the information related to Type II CSI includes i) first Precoding Matrix Indicator (PMI) information related to a plurality of Discrete Fourier Transform (DFT) vectors and ii) second PMI information related to coefficients which are combined with each of the plurality of DFT vectors,
   wherein a codebook is generated based on the first PMI information and the second PMI information,
   wherein the first PMI information includes information related to phase change values, and each of phase change values is related to each subband respectively, and
   wherein the phase change values are combined with the plurality of DFT vectors to generate the codebook.

8. The base station of claim 7, wherein the phase change values are elements of a matrix, wherein each of rows of the matrix corresponds to each subband and a number of columns of the matrix is smaller than a number of total subbands.

* * * * *